United States Patent
Shapira

(10) Patent No.: US 10,083,205 B2
(45) Date of Patent: Sep. 25, 2018

(54) QUERY CARDS

(71) Applicant: Samsung Electronics Co., Ltd., Suwon-si, Gyeonggi-do (KR)

(72) Inventor: Liron Shapira, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 14/620,475

(22) Filed: Feb. 12, 2015

(65) Prior Publication Data

US 2015/0227633 A1    Aug. 13, 2015

Related U.S. Application Data

(60) Provisional application No. 62/096,277, filed on Dec. 23, 2014, provisional application No. 62/096,362, filed on Dec. 23, 2014, provisional application No. 61/939,055, filed on Feb. 12, 2014.

(51) Int. Cl.
*G06F 17/30* (2006.01)

(52) U.S. Cl.
CPC .. *G06F 17/30395* (2013.01); *G06F 17/30696* (2013.01); *G06F 17/30991* (2013.01); *G06F 17/30424* (2013.01); *G06F 17/30554* (2013.01); *G06F 17/30634* (2013.01); *G06F 17/30643* (2013.01); *G06F 17/30864* (2013.01); *G06F 17/30979* (2013.01)

(58) Field of Classification Search
CPC ........ G06F 17/30395; G06F 17/30554; G06F 17/30864; G06F 3/0482; G06F 3/0488; G06F 17/30424; G06F 17/30696; G06F 17/30979; G06F 17/30991; G06F 17/30643; G06F 17/30634

USPC ........................................................ 707/706
See application file for complete search history.

(56) References Cited

U.S. PATENT DOCUMENTS

| 7,779,370 B2 * | 8/2010 | Mavinkurve | G06F 3/0481 715/767 |
| 8,433,512 B1 * | 4/2013 | Lopatenko | G01C 21/3679 701/400 |
| 8,566,029 B1 * | 10/2013 | Lopatenko | G08G 1/0962 701/426 |

(Continued)

FOREIGN PATENT DOCUMENTS

EP    1566746 A1    8/2005

OTHER PUBLICATIONS

International Search Report and Written Opinion of WO Application No. PCT/US2015/015567, dated Apr. 30, 2015.

*Primary Examiner* — Thanh-Ha Dang
(74) *Attorney, Agent, or Firm* — Jefferson IP Law, LLP

(57) ABSTRACT

A method for performing a search on a user device includes transmitting a search query to a search engine from a processing device via a network and receiving, by the processing device, search results from the search engine. The method also includes displaying, by the processing device, the search results and receiving, by the processing device, a first user input directed to one or more of the input elements of the query card. The method also includes receiving, by the processing device, a second user input selecting the query card, generating, by the processing device, the selected search query based on the first user input and transmitting the selected search query to the search engine.

20 Claims, 20 Drawing Sheets

(56) References Cited

U.S. PATENT DOCUMENTS

| | | | |
|---|---|---|---|
| 8,745,018 B1 * | 6/2014 | Singleton | G06F 17/30899 707/705 |
| 8,954,894 B2 * | 2/2015 | Lorenz | G06F 3/0486 345/179 |
| 9,600,143 B2 * | 3/2017 | Arun | G06F 3/0482 |
| 9,733,802 B2 * | 8/2017 | Nelson | G06F 3/0482 |
| 2008/0172362 A1 * | 7/2008 | Shacham | G06F 17/30696 |
| 2008/0275864 A1 * | 11/2008 | Kim | G06F 17/30867 |
| 2009/0083232 A1 * | 3/2009 | Ives | G06F 17/30864 |
| 2009/0177988 A1 | 7/2009 | Martins | |
| 2009/0216730 A1 | 8/2009 | Sastry et al. | |
| 2012/0124061 A1 * | 5/2012 | Macbeth | G06F 9/445 707/749 |
| 2012/0173520 A1 * | 7/2012 | Wu | G06F 17/30867 707/723 |
| 2012/0316955 A1 * | 12/2012 | Panguluri | G06Q 30/02 705/14.41 |
| 2013/0174034 A1 * | 7/2013 | Brown | G06F 3/048 715/708 |
| 2013/0254176 A1 * | 9/2013 | Davlos | G06F 17/30702 707/706 |
| 2013/0262445 A1 * | 10/2013 | Corella | G06F 3/0481 707/722 |
| 2013/0297317 A1 | 11/2013 | Lee et al. | |
| 2014/0012574 A1 * | 1/2014 | Pasupalak | G06F 17/30554 704/235 |
| 2014/0040307 A1 * | 2/2014 | Kavety Loganathan | G06F 17/30864 707/769 |
| 2014/0053088 A1 * | 2/2014 | Civelli | G06F 3/04817 715/760 |
| 2014/0282136 A1 * | 9/2014 | Marantz | G06F 17/3097 715/764 |
| 2015/0268836 A1 | 9/2015 | Guerrero et al. | |
| 2017/0060860 A1 * | 3/2017 | Imbruce | G06F 17/30864 |

* cited by examiner

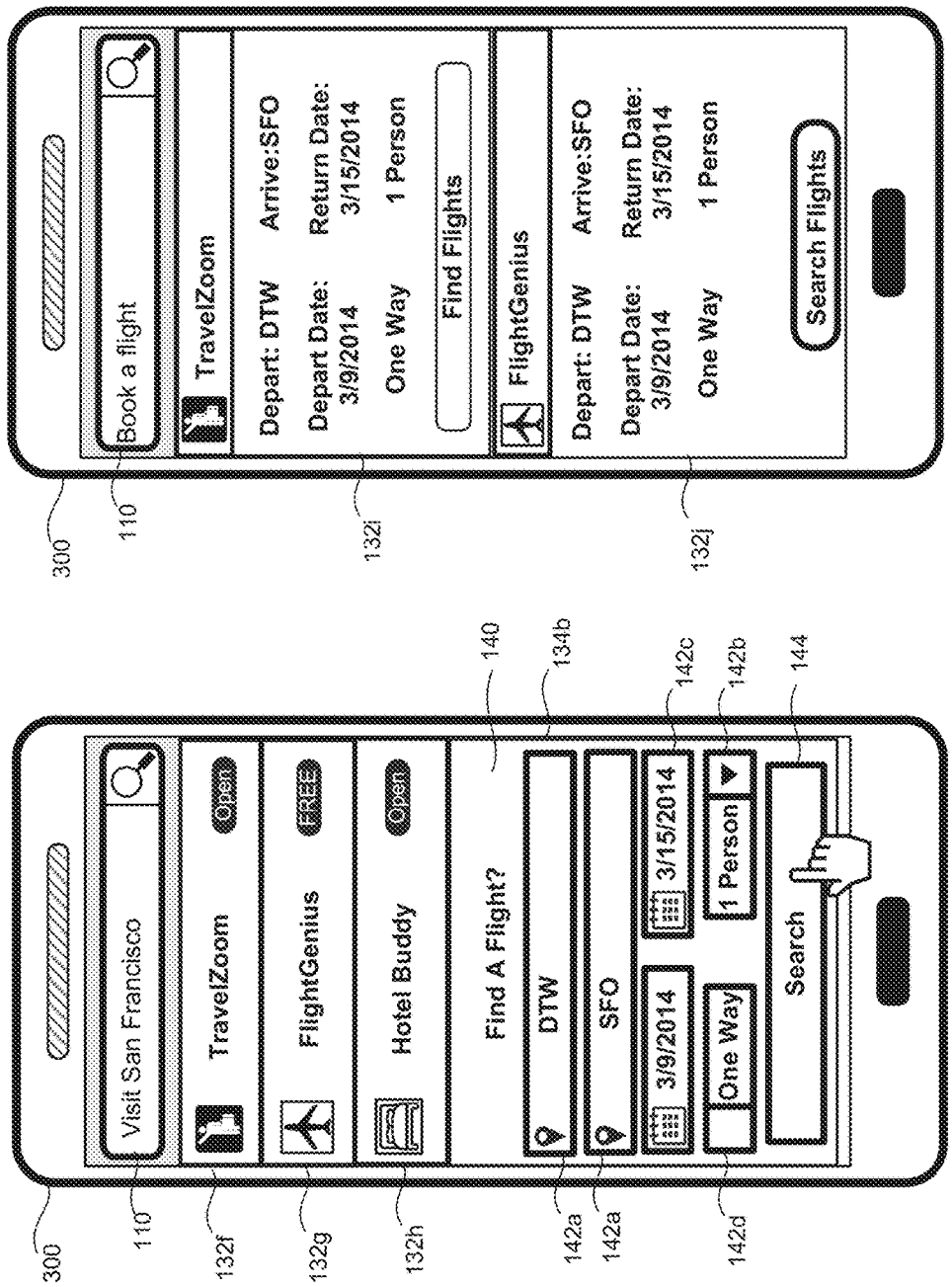

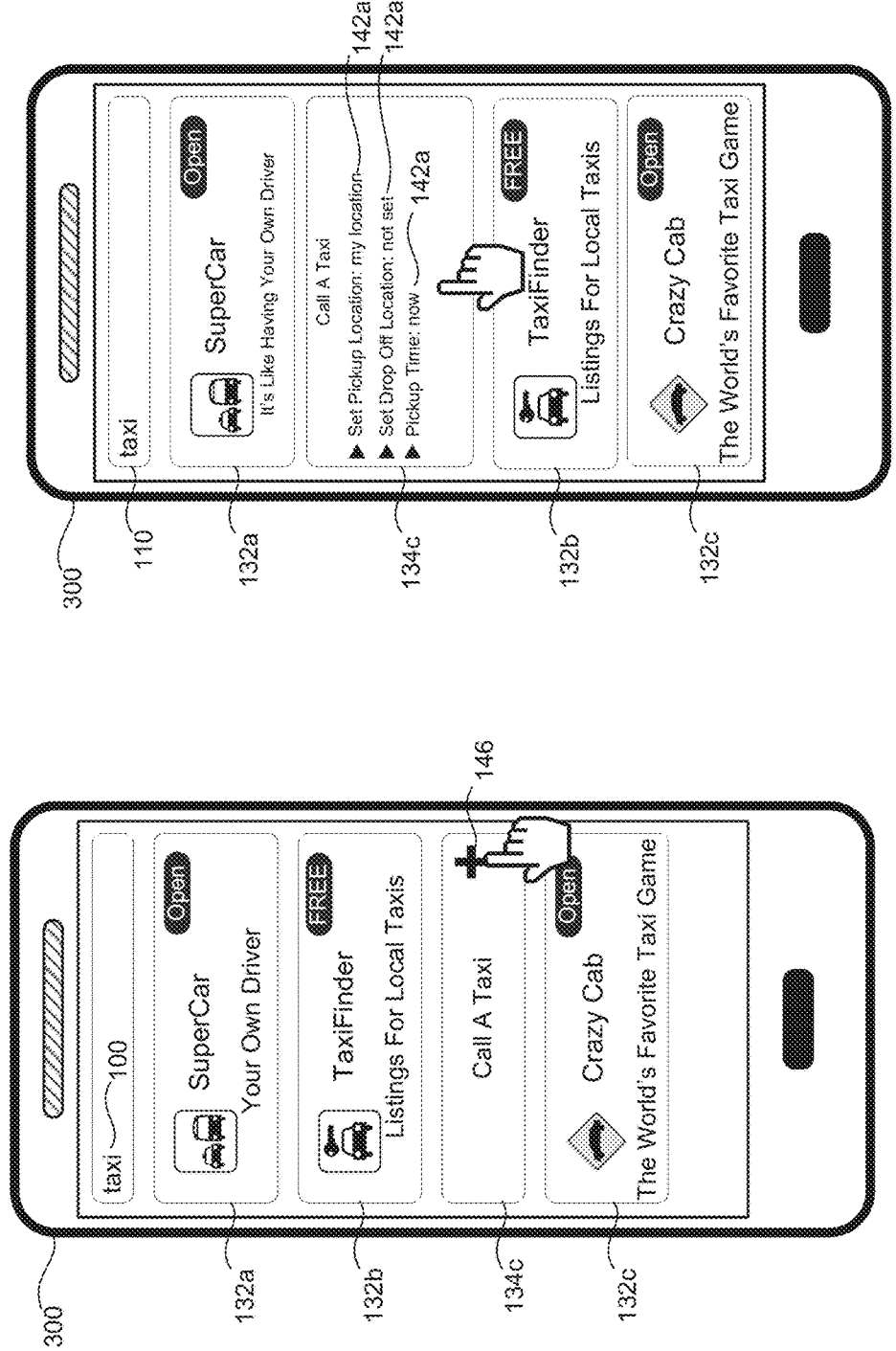

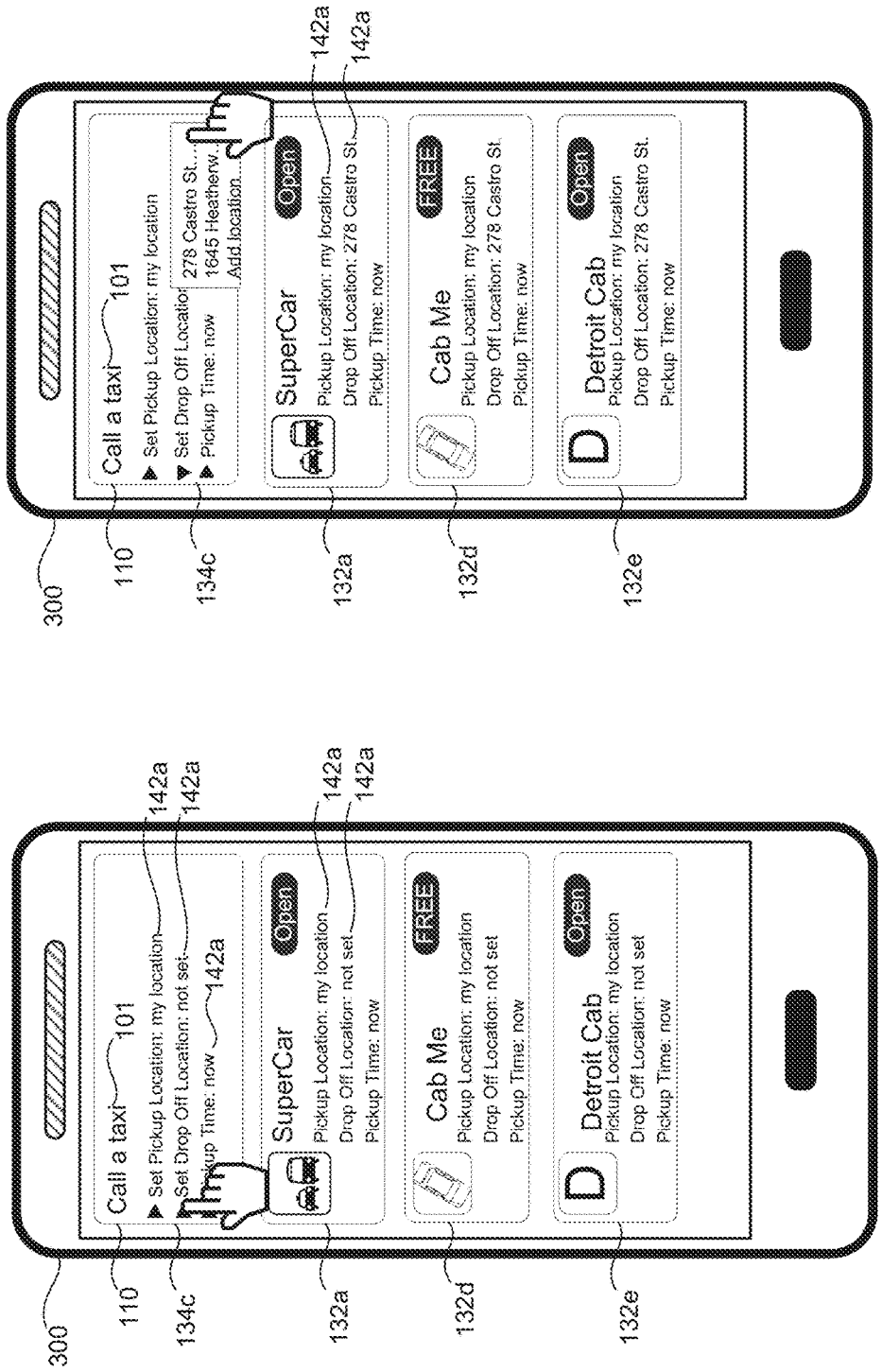

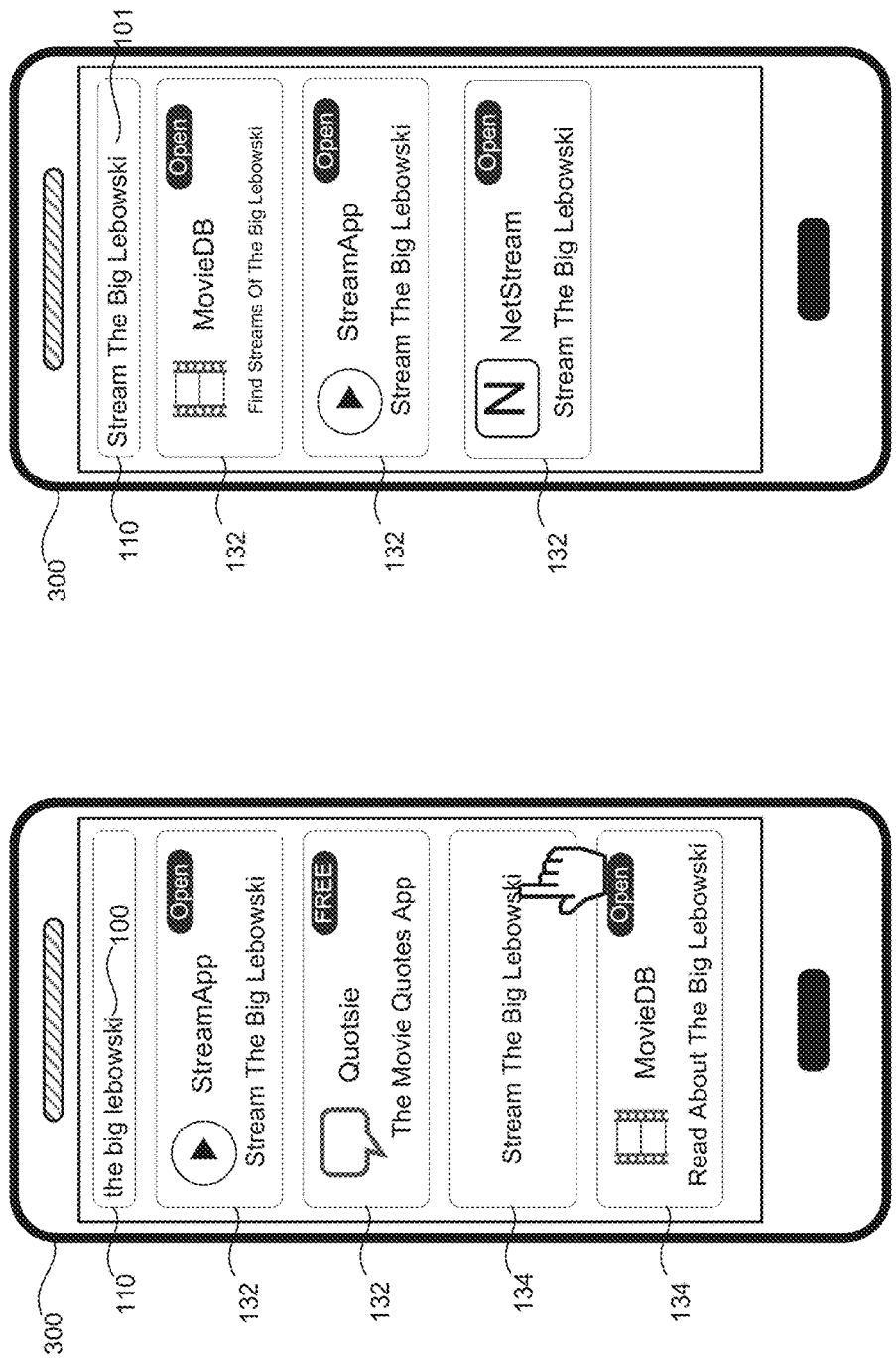

QUERY CARDS

CROSS REFERENCE TO RELATED APPLICATIONS

This U.S. patent application claims priority under 35 U.S.C. § 119(e) to: U.S. Provisional Application 61/939, 055, filed on Feb. 12, 2014; U.S. Provisional Application 62/096,277, filed on Dec. 23, 2014; and U.S. Provisional Application 62/096,362, filed on Dec. 23, 2014. The disclosures of these prior applications are considered part of the disclosure of this application and are hereby incorporated by reference in their entireties.

TECHNICAL FIELD

This disclosure relates to embedding query cards in search results.

BACKGROUND

Search engines can be utilized in many different fields. Search engines can be used to identify content on the World Wide Web (the "Web"), identify applications, or identify functionalities across the Web and a collection of applications. Central to any search process is the search query. A search query is a collection of one or more query terms that a search engine utilizes to identify relevant search results. It is often convenient for users to enter shorter search queries into a search bar rather than more descriptive search queries. Furthermore, users tend to forego narrowing their intentions when entering search queries. For instance, a user searching for flights may enter a short search query such as "find flights," but will not typically enter departure cities, arrival cities, and dates. In another example, a user looking to make a taxi reservation may enter a short search query such as "taxi," but may forego entering a pickup location or drop off location. In these instances, the user may wait until they have accessed a resource to enter all of this information via a GUI of the resource. The tradeoff is that the shorter search query is more ambiguous than a longer more descriptive search query.

SUMMARY

One aspect of the disclosure provides a method for performing a search on a user device. The method includes transmitting, by a processing device of the user device, a search query to a search engine via a network, and receiving, also by the processing device, search results from the search engine via the network. The search results include at least one application result object that defines an application card and a query result object that defines a query card. Each application card is a graphical user interface element that links to a state of one of a plurality of applications. The query card is a graphical user interface element that corresponds to a selected search query and includes one or more input elements that receive input from a user via a user interface of the user device. The method also includes displaying, by the processing device, the search results and receiving, also by the processing device, a user input directed to one or more of the input elements of the query card. The user input indicates one or more values respectively corresponding to the one or more of the input elements. The method also includes receiving, by the processing device, a user selection of the query card and generating, by the processing device, the selected search query based on the user input. Finally, the method includes transmitting, by the processing device, the selected search query to the search engine.

Implementations of the disclosure may include one or more of the following optional features. In some implementations, generating the selected search query includes generating the selected search query using a query identifier corresponding to the selected query card. The selected search query is a structured search query that has one or more parameter fields that respectively receive predetermined parameter types. In addition, generating the selected search query includes determining the values inputted into one or more of the input elements of the query card, and assigning the inputted values to the corresponding parameter fields of the structured search query.

In some examples, generating the selected search query includes generating the selected search query using a template that identifies a set of predetermined query terms corresponding to the selected query card and one or more parameter fields that receive predetermined parameter types. The selected search query is a natural language search query. In this example, generating the selected search query further includes determining the values inputted into one or more of the input elements of the query card, and assigning the inputted values to the corresponding parameter fields of the selected search query.

In some implementations, the method further includes receiving, by the processing device, new search results in response to the selected search query. The new search results include one or more new application cards. Each of the new application cards includes one or more access mechanisms that are based on input parameters of the input provided in the input elements. The method also includes displaying, by the processing device, the new search results. When displayed, the one or more new application cards display the values in each of the one or more new application cards. The method may also include receiving (by the processing device) a user selection of one of the new application cards, launching (by the processing device) a native application indicated by the access mechanism, and setting (by the processing device) the native application to a state indicated by the access mechanism (e.g., a script or an application resource identifier). In some examples, launching the native application includes downloading (by the processing device) the native application from a digital distribution platform. In some examples, for each new application card, the one or more access mechanisms are generated based on the values provided as user input.

Another aspect of the disclosure provides a user device having a network interface, a user interface, a processing device, and a non-transitory storage device. The processing device is in communication with the network interface and the user interface. The non-transitory storage device is in communication with the processing device. The non-transitory storage device stores instructions that when executed on the processing device cause the processing device to perform operations. The operations include transmitting a search query to a search engine via a network, and receiving search results from the search engine also via the network. The search results include at least one application result object that define an application card and a query result object that defines a query card. Each application card is a graphical user interface element that links to a state of one of a plurality of applications. The query card is a graphical user interface element that corresponds to a selected search query and includes one or more input elements that receive input from a user via the user interface. The operations also include displaying the search results on the user interface, and receiving a user input directed to one or more of the input elements of the query card. The user input indicates one or more values respectively corresponding to the one or more of the input elements. The operations also include receiving a user selection of the query card and generating the selected search query based on the user input. Finally, the operations include transmitting the selected search query to the search engine.

In some implementations, generating the selected search query includes generating the selected search query using a query identifier corresponding to the selected query card. The selected search query is a structured search query that has one or more parameter fields that respectively receive predetermined parameter types. In addition, generating the selected search query includes determining the values inputted into one or more of the input elements of the query card, and assigning the inputted values to the corresponding parameter fields of the structured search query.

In some examples, generating the selected search query includes generating the selected search query using a template that identifies a set of predetermined query terms corresponding to the selected query card and one or more parameter fields that receive predetermined parameter types. The selected search query is a natural language search query. In this example, generating the selected search query further includes determining the values inputted into one or more of the input elements of the query card, and assigning the inputted values to the corresponding parameter fields of the selected search query.

In some implementations, the operations further include receiving new search results in response to the selected search query. The new search results include one or more new application cards. Each of the new application cards includes one or more access mechanisms that are based on input parameters of the input provided in the input elements. The operations also include displaying the new search results. When displayed, the one or more new application cards display the values in each of the one or more new application cards. The operations may also include receiving a user selection of one of the new application cards, launching a native application indicated by the access mechanism, and setting the native application to a state indicated by the access mechanism (e.g., a script or an application resource identifier). In some examples, launching the native application includes downloading the native application from a digital distribution platform. In some examples, for each new application card, the one or more access mechanisms are generated based on the values provided as user input.

Yet another aspect of the disclosure provides a method that includes receiving, at a processing device, a search query containing one or more query terms from a user device via a network. The method also includes generating (at the processing device) one or more application cards based on the search query. Each application card corresponds to a state of a corresponding application and includes at least one access mechanism for accessing a state of the application. Each application card has a result score associated therewith. The method also includes generating (at the processing device) a query card based on the search query. The query card has a broad action associated therewith and is used by the user device to initiate a selected search query related to the broad action. The query card has an intent score associated therewith. The method also includes generating (at the processing device) search results by interweaving the one or more application cards and the query card based on the respective result scores and intent score thereof, and transmitting (at the processing device) the search results to the user device.

In some implementations, generating the query card includes identifying a query intent record based on the search query defining the broad action and query intent data that defines features relating to the broad action. Generating the query card may also include generating an intent recognition object based on the identified query intent record. The intent recognition object indicates the broad action defined in the query intent record from which the intent recognition object was generated. Generating the query card may also include determining whether the query intent record from which the intent recognition object was generated has a corresponding intent card layout file, and when the query intent record has the a corresponding intent card layout file, generating the query card based on the intent card layout file.

Generating the query card may include determining the intent score of the query card based on the query intent record and the search query. Additionally or alternatively, in some examples, the query card is generated based on a query intent record defining the broad action and features of the broad action, and the selected search query defined by query card corresponds to the broad action. The method may include receiving (at the processing device) the selected search query from the user device in response to a user selection of a query card at the user device, and retrieving (also at the processing device) the query intent record used to generate the selected query card. The method may also include identifying (at the processing device) one or more function records from the query intent records. Each function record defines a state of a respective application that corresponds to the broad action defined in the query intent record. The method also includes generating (at the processing device) one or more new application cards based on the one or more function records, and transmitting (also at the processing device) the search results to the user device. The query card may define one or more input elements that when rendered at the user device receive input parameters that are included in the selected search query when the query card is selected. Additionally, the query intent record used to generate the query card may include one or more function syntaxes and a set of one or more input parameters that the query card receives. Each function syntax includes a specification to generate a function identifier based on received input parameters. The function identifier is used to generate one or more access mechanisms that the user device utilizes to access a state of an application given a set of parameter values. The method may also include receiving (at the processing device) the selected search query from the user device in response to a user selection of a query card at the user device. The selected search query is indicative of a set of one or more query terms and includes values of one or more of the input parameters. The method may also include retrieving (at the processing device) the query intent record used to generate the selected query card. For each function syntax defined in the query intent record, the method may include generating (at the processing device) a new function identifier based on the function syntax and the values of the input parameters, and associating (at the processing device) the function identifier to a function record indicating a state of an application that corresponds to the generated function identifier and defining features of the state. The method also includes determining (at the processing device) a results score for each of the function identifiers based on features of the function records and the selected search query, and selecting (at the processing device) one or more of the scored function records based on the respective result scores of the scored function records. The method also includes generating (at the processing device) one or more new application cards based on the selected function records and the values of the one or more input parameters to obtain new search results. Each application card includes one or more access mechanisms, where at least one of the access mechanisms is generated based on a respective generated function identifier. The method includes transmitting the search results to the user device. The new application cards indicate the values of the received input parameters, whereby when the new application cards are rendered at the user device the new application cards display the input parameters in each of the new application cards.

In some implementations, the search results include a plurality of query cards that include the query card. The plurality of query cards are interweaved with the one or more application cards.

In some examples, generating the query card includes parsing the query terms of the search query to identify one or more intent parse objects. Each intent parse object defines a potential parameter type of one or more of the query terms and a value corresponding to the potential parameter type. Generating the query card also includes identifying a query intent record based on the potential parameter type. The query intent record defines a broad action corresponding to the selected search query. In addition, generating the query card includes generating an intent recognition object based on the query intent record. The intent recognition object indicates the broad action defined in the query intent record and one or more parameter types that are relevant to the broad action. Generating the query card also includes generating the query card based on the intent recognition object. When the query card is rendered by the user device, the query card includes one or more input parameters that respectively receive user input that is included in the selected search query upon selection of the query card.

Yet another aspect of the disclosure provides a search engine, a network interface, a processing device, and a non-transitory storage device. The processing device is in communication with the network interface and a user interface. The non-transitory storage device is in communication with the processing device. The non-transitory storage device stores instructions that when executed on the processing device cause the processing device to perform operations. The operations include receiving a search query containing one or more query terms from a user device via a network. The operations also include generating one or more application cards based on the search query. Each application card corresponds to a state of a corresponding application and includes at least one access mechanism for accessing a state of the application. Each application card has a result score associated therewith. The operations include generating a query card based on the search query. The query card has a broad action associated therewith and is used by the user device to initiate a selected search query related to the broad action. The query card has an intent score associated therewith. The operations include generating search results by interweaving the one or more application cards and the query card based on the respective result scores and intent score thereof, and the search results to the user device.

In some implementations, the non-transitory storage device stores a plurality of query intent records. Each query intent record defines a broad action, features relating to the broad action, and triggering data. Generating the query card may include identifying a query intent record based on the search query defining the broad action and query intent data that defines features relating to the broad action. Generating the query card may also include generating an intent recognition object based on the identified query intent record. The intent recognition object indicates the broad action defined in the query intent record from which the intent recognition object was generated. Generating the query card may also include determining whether the query intent record from which the intent recognition object was generated has a corresponding intent card layout file, and when the query intent record has the a corresponding intent card layout file, generating the query card based on the intent card layout file.

Generating the query card may include determining the intent score of the query card based on the query intent record and the search query. Additionally or alternatively, in some examples, the query card is generated based on a query intent record defining the broad action and features of the broad action, and the selected search query defined by the query card corresponds to the broad action. The operations may include receiving the selected search query from the user device in response to a user selection of a query card at the user device, and retrieving the query intent record used to generate the selected query card. The operations may also include identifying one or more function records from the query intent records. Each function record defines a state of a respective application that corresponds to the broad action defined in the query intent record. The operations also include generating one or more new application cards based on the one or more function records, and transmitting the search results to the user device. The query card may define one or more input elements that when rendered at the user device receive input parameters that are included in the selected search query when the query card is selected. Additionally, the query intent record used to generate the query card may include one or more function syntaxes and a set of one or more input parameters that the query card receives. Each function syntax includes a specification to generate a function identifier based on received input parameters. The function identifier is used to generate one or more access mechanisms that the user device utilizes to access a state of an application given a set of parameter values. The operations may also include receiving the selected search query from the user device in response to a user selection of a query card at the user device. The selected search query is indicative of a set of one or more query terms and includes values of one or more of the input parameters. The operations may also include retrieving the query intent record used to generate the selected query card. For each function syntax defined in the query intent record, the operations may include generating a new function identifier based on the function syntax and the values of the input parameters, and associating the function identifier to a function record indicating a state of an application that corresponds to the generated function identifier and defining features of the state. The operations also includes determining a results score for each of the function identifier based on features of the function records and the selected search query, and selecting (at the processing device) one or more of the scored function records based on the respective result scores of the scored function records. The operations also includes generating (at the processing device) one or more new application cards based on the selected function records and the values of the one or more input parameters to obtain new search results. Each application card includes one or more access mechanisms, where at least one of the access mechanisms is generated based on a respective generated function identifier. The operations include transmitting the new search results to the user device. The new application cards indicate the values of the received input parameters, whereby when the new application cards are rendered at the user device the new application cards display the input parameters in each of the new application cards.

In some implementations, the search results include a plurality of query cards that include the query card. The plurality of query cards are interweaved with the one or more application cards.

In some examples, generating the query card includes parsing the query terms of the search query to identify one or more intent parse objects. Each intent parse object defines a potential parameter type of one or more of the query terms and a value corresponding to the potential parameter type. Generating the query card also includes identifying a query intent record based on the potential parameter type. The query intent record defines a broad action corresponding to the selected search query. In addition, generating the query card includes generating an intent recognition object based on the query intent record. The intent recognition object indicates the broad action defined in the query intent record and one or more parameter types that are relevant to the broad action. Generating the query card also includes generating the query card based on the intent recognition object. When the query card is rendered by the user device, the query card includes one or more input parameters that respectively receive user input that is included in the selected search query upon selection of the query card.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1B-1K are schematic views of examples of a user device displaying search results that include query cards.

Like reference symbols in the various drawings indicate like elements.

DETAILED DESCRIPTION

Figure 1A:
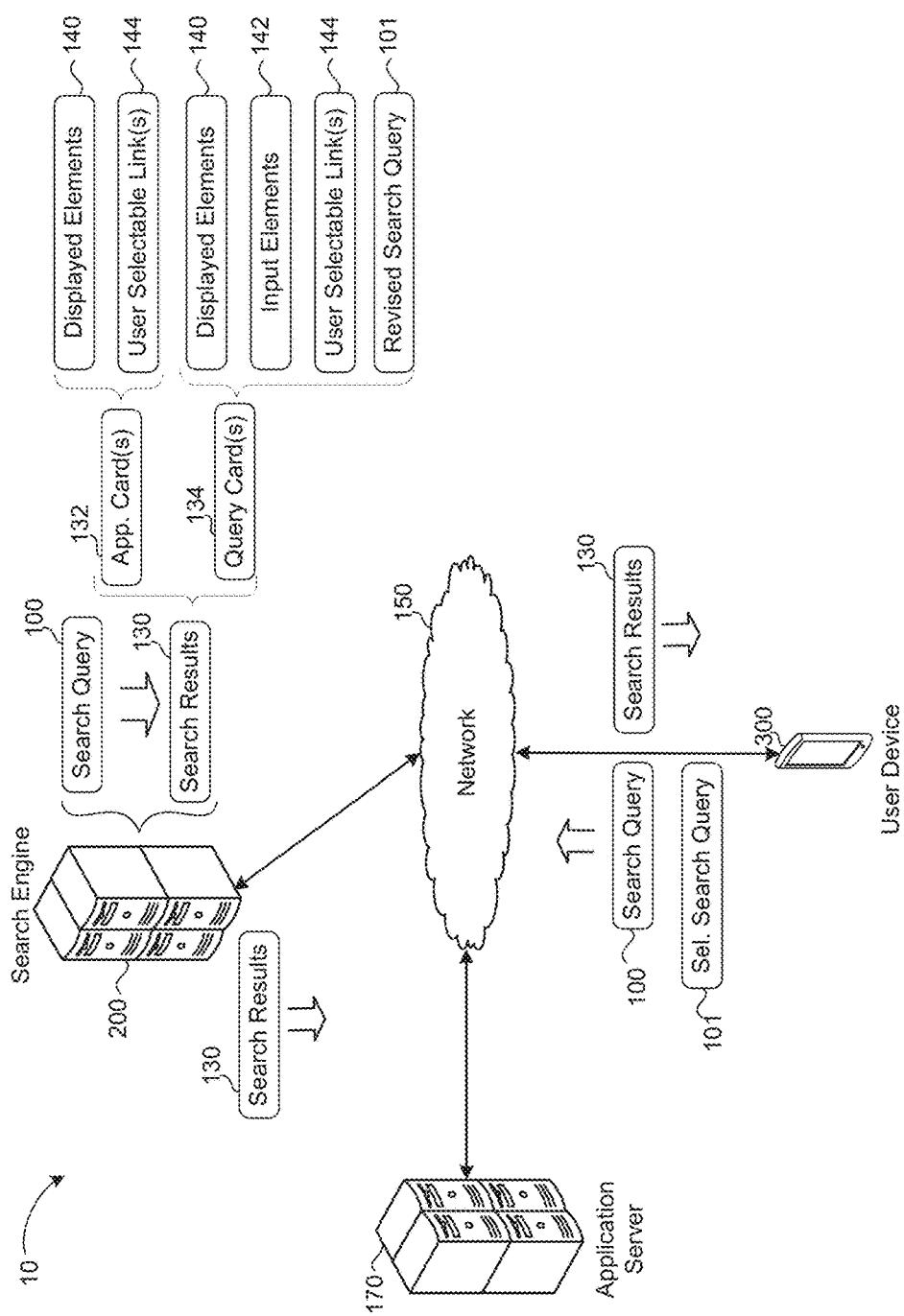
FIG. 1A is a schematic view of an example environment of a search engine that receives search queries from user devices.

FIG. 1A illustrates an example environment 10 of a search engine 200. A search engine 200 is a collection of one or more computing devices that receives search queries 100 from user devices 300 via a network 150. While the user device 300 is depicted as a smartphone, a user device 300 can be any suitable user computing device including, but not limited to, a tablet computing device, a personal computing device, a laptop computing device, a gaming device, a vehicle infotainment device, and/or a smart appliance (e.g., smart refrigerator or smart television). The search engine 200 may perform any suitable type of searches. For example, the search engine 200 may perform web searches (e.g., for content found on websites), application searches (e.g., for applications having particular attributes), and/or function searches (e.g., for specific states or functions of either native or web applications). For purposes of explanation, reference is made to a search engine 200 that performs function searches. In these implementations, the search engine 200 may return search results 130 that indicate specific states of applications. The techniques described herein may, however, be applied to other suitable searches.

The search engine 200 generates search results 130 based on a search query 100 (and in some cases one or more context parameters) and provides the search results 130 to a requesting user device 300. In some implementations, the search results 130 include a plurality of cards 132, 134. A card 132, 134 is a graphical user interface element that when rendered in a search engine results page (SERP), represents a single unit that provides displayed elements 140 to a user and can include one or more user selectable links 144. A SERP can refer to a graphical user interface that displays search results 130. According to some implementations of the present disclosure, a card 132, 134 can further include one or more input elements 142 that respectively receive input parameters. A card 132, 134 may be embodied as a set of instructions and/or data that the search engine 200 transmits to the user device 300 and that the user device 300 renders into a displayable format. In some implementations, each card 132, 134 is encoded into a respective result object, which contains the instructions and/or data. The search engine 200 may encode the result objects in a file (e.g., a .json file), which the search engine 200 transmits to the user device 300. The user device 300 receives search results 130 containing one or more result objects, the user device 300 renders each result object into a displayable card, whereby the displayable card is displayed in the SERP. Search results 130 can include one or more application cards 132 and in some instances one or more query cards 134.

An application card 132 provides displayed elements 140 that provide information regarding a software application and/or one or more states of the software application. Examples of displayed elements 140 can be a name of the software application, a description of the software application, a title of a state of the software application, a description corresponding to the state of the software application, an icon of the software application, and/or a screenshot of the software application. An application card 132 further includes one or more user selectable links 144 that link to the software application (e.g., a web application edition and/or a native application edition) and/or a digital distribution platform (e.g., the GOOGLE PLAY digital distribution platform maintained by Google, Inc., the AMAZON APPSTORE digital distribution platform maintained by Amazon, Inc., or the APPLE APP STORE maintained by Apple Inc.) where the user can download a native application edition of the software application. A user selectable link 144 can refer to a GUI element that displays text and/or images that when selected by a user, causes the user device 300 to access a state of a software application.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using editions of the software application (e.g., native application editions of the software application and/or web application editions of the software application).

A state of a software application can refer to a parameterized function of the software application. A software application can perform one or more functions. A function is a service of the software application that can be accessed by a user device 300 via an edition of the software application. Non-limiting examples of functions can include "making a restaurant reservation" (which may parameterized with a restaurant identifier, a date, and a time), "searching for a cuisine (which may be parameterized with a cuisine type and a location) "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device 300 using an edition of the software application. An operating system of a user device 300 can instruct an edition of a software application to access a state of the software application using an access mechanism.

A native application edition (or "native application") can refer to an edition of a software application that is, at least in part, installed on a user device 300. In some scenarios, a native application is installed on a user device 300, but accesses an external resource 170 (e.g., an application server) to obtain data from the external resource 170. For example, social media applications, weather applications, news applications, and search applications may respectively be accessed by one or more native application editions that execute on various user devices 300. In such examples, a native application can provide data to and/or receive data from the external resource 170 while accessing one or more functions of the software application. In other scenarios, a native application is installed on the user device 300 and does not access any external resources 170. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") are editions of a software application that may be partially executed by a remote computing device (e.g., a web server or application server) at the request of user device 300 (e.g., by a web browser of the user device 300). For example, a web application may be an application that is executed, at least in part, by a web server and accessed by a web browser (e.g., a native application) of the user device 300. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states or functions of the restaurant review application cannot be accessed by the web application edition but there is overlap between the states or functions that can be accessed by the native application editions and the web application edition.

A user selectable link 144 can include one or more access mechanisms for accessing a state of a software application or a state of a digital distribution platform. Examples of access mechanisms include, but are not limited to, native application access mechanisms (hereinafter "application access mechanism"), web access mechanisms, application download access mechanisms, and/or scripts. A user device 300 uses an access mechanism to access functionality of an application. An access mechanism can provide access to a default page of an application (e.g., a home page) or a deeper state of the application.

In some examples, an application access mechanism can refer to a string that includes a reference to a native application (e.g., one of native applications) and indicates one or more operations for the user device 300 to perform. If a user selects a user selectable link 144 including an application access mechanism, the user device 300 may launch the native application referenced in the application access mechanism and perform the one or more operations indicated in the application access mechanism. In some implementations, any combination of the operating system of the user device 300, a search application executed by the user device 300, a native application executed by the user device 300, and/or a web browser executed by the user device 300 can launch the native application referenced in the application access mechanism and set the state of the application based on the operations indicated in the application access mechanism. An example of an application access mechanism that can be used to access a state of a software application called "ExampleApp" using a native application edition may be: exampleapp::search?find_desc=thai&find_loc=Santa+Rosa%2C+CA&ns=1.

A web access mechanism may refer to a resource identifier that includes a reference to a web resource (e.g., a page of a web application/website). For example, a web access mechanism may refer to a uniform resource locator (a "URL") (i.e., a web address) used in the hypertext transfer protocol (HTTP). If a user selects a user selectable link 144 including a web access mechanism, the user device 300 may launch the web browser application and retrieve the web resource indicated in the resource identifier. An example of a web access mechanism to access the state of the ExampleApp software application using a web application may be: http://www.exampleapp.com/search?find_desc=thai&find_loc=Santa+Rosa%2C+CA&ns=1.

An application download access mechanism may refer to a resource identifier that includes an address where a native application can be downloaded (e.g., an address of a digital distribution platform) in the scenario where a native application edition of the application is not installed on the user device 300. If a user selects a user selectable link 144 including an application download access mechanism, the user device 300 may access a digital distribution platform from which the referenced native application edition may be downloaded.

A script is a set of instructions that when executed by the user device 300 cause the user device 300 to access a resource indicated by the script. For example, the script may instruct an operating system of the user device 300 to launch the native application, and may define one or more additional instructions to access a particular state of the application. A script may be used instead of another type of access mechanism when an application is not configured to be referenced by the other types of access mechanisms. For example, a state of a native application that is not configured to accept application resource identifiers can be accessed using a script. In an example, the script may instruct the operating system to launch the native application and to input one or more parameters and/or make one or more selections to access the state of the native application.

In some situations, a search engine 200 is unable to fully discern the meaning of the search query 100. For instance, if the user enters the search query 100 "movie," it is unclear whether the user wants to find movie times, watch movie trailers, buy movie tickets, or stream a movie. Similarly, if the user enters the search query 100 "taxi," it is unclear whether the user wants to call a taxi or play a taxi driving video game. Furthermore, many users choose to enter shorter, less detailed search queries 100 instead of longer more detailed search queries 100, especially when using mobile user devices 300. To alleviate these concerns, the search engine 200 is configured to include query cards 134 in the search results 130. In some implementations, the search engine 200 interweaves the query cards 134 with the application cards 132, such that the query cards 134 appear in the organic search results 130. In this way, the application cards 132 and query cards 134 can be displayed in the same general area within the SERP. By having the query cards 134 appear in the SERP interweaved with application cards 132, space on the SERP can be more efficiently allocated. Additionally or alternatively, by having the query cards 134 appear in the SERP, users can easily identify and select a query card 134.

Query cards 134, when rendered at a user device 300, can provide the user with an opportunity to clarify and/or narrow the intention of the user to the search engine 200. A query card 134 can include displayed elements 140, a user selectable link 144, and a selected search query 101. Further, in some implementations, a query card 134 includes input elements 142. The displayed elements 140 can include representative terms indicating a broad action associated with the query card 134 (e.g., "call a cab," "book a flight," or "find a movie time"). In some implementations, the selected search query 101 contains a new set of query terms. For example, the selected search query 101 can include the representative query terms displayed in the query card 134 or a similar set of query terms. In other implementations, the selected search query 101 can include a query identifier ("query ID") that identifies a set of query terms known to the search engine 200. The user selectable link 144, when selected by a user, causes the user device 300 to transmit the selected search query 101 to the search engine 200.

In some implementations, the query card 134 includes one or more input elements 142. Input elements 142 are graphical user interface (GUI) elements that receive input parameters from a user via a user interface of the user device 300. Examples of input elements 142 are text input boxes, drop down menus, calendar input elements, and check boxes. A user can input one or more input parameters into one or more of the input elements 142 and select a user selectable link 144 displayed in the query card 134. Upon selecting the user selectable link 144, the user device 300 transmits the revised query 101, which includes any inputted parameters, to the search engine 200. In some implementations, the user device 300 transmits a natural language set of query terms to the search engine 200, such that the natural language set of query terms includes the inputted parameters. In other implementations, the user device 300 transmits a structured selected search query 101. A structured selected search query 101 can include a query ID and one or more parameter fields that define the values of the inputted parameters.

In response to a selected search query 101, the search engine 200 conducts a subsequent search and generates new search results 130. The new search results 130 are likely to be more relevant to the user's intention, as the user's selection of a query card 134 more explicitly defined the user's intended query. The search engine 200 can deliver the search results 130 as a file (e.g., a .json file). In such implementations, the file contains one or more result objects. Each result object can correspond to a different application card 132 and may include instructions and/or data that the user device 300 utilizes to render displayable search results 130. For purposes of explanation, reference to application cards 132 and query cards 134 can include result object representation and rendered and displayed cards 132, 134.

The search engine 200 is described as receiving search queries 100 and selected search queries 101 from one or more user device(s) 300 via a network. In some implementations, the search engine 200 receives the search queries 100, 101 from user devices 300 via a partner device (not shown). A partner device may belong to a company or organization other than that which operates the search system 200 (e.g., internet search providers, wireless communications service providers, or third-party search providers). The partner device can route the search query 100, 101 to the search system 200 on behalf of the user device 300. Thus, in such scenarios, the search engine 200 ultimately receives the search query 100, 101 from a user device 300, even when by way of a partner device.

Figure 1C:
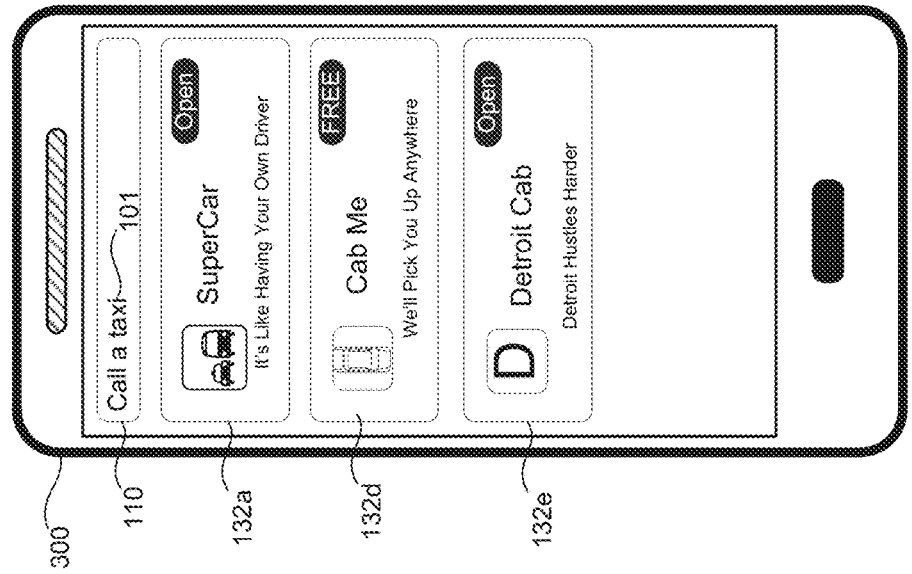
Figure 1B:
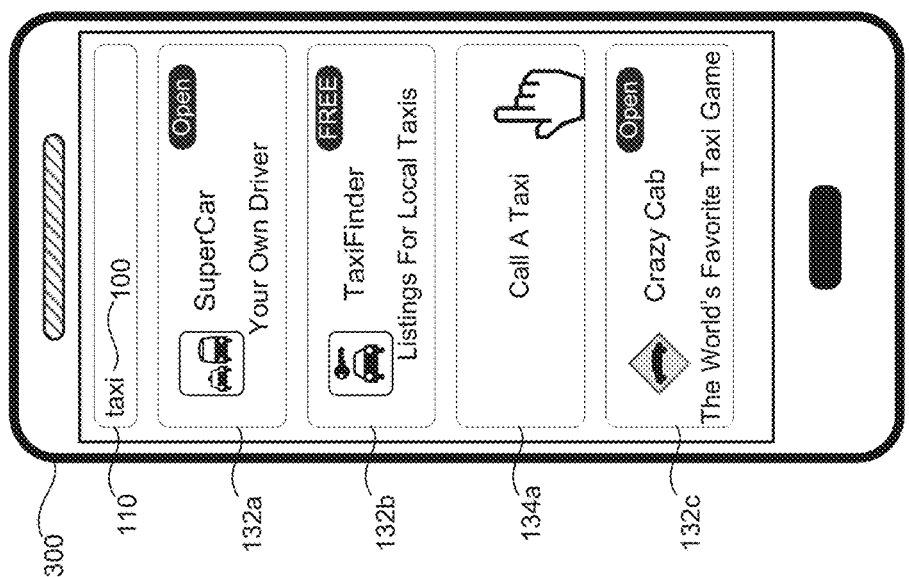

FIGS. 1B-1K are examples of a user device 300 displaying search results 130. FIG. 1B illustrates an example of a user device 300 displaying a SERP. In the illustrated example, the user has input the search query 100 "taxi" into a search bar 110. In response to the search query 100, the search engine 200 returns, and the user device 300 displays, three application cards 132a, 132b, 132c and a query card 134a. The first application card 132a if selected by the user can launch an application called "SuperCar." The second application card 132b, if selected by the user, causes the user device 300 to access a digital distribution platform to download an application called "TaxiFinder," which provides local listings for taxi services. The third application card 132c, if selected by the user, causes the user device 300 to launch an application called "Crazy Cab," which is an example taxi driving video game. The query card 134a displays text that attempts to disambiguate the user's intention (e.g., "call a taxi"). If the user selects the query card 134a, the user device 300 transmits a selected search query 101 to the search engine 200 corresponding to the initial search query 100 (i.e., "taxi"). In some implementations, the query terms of the selected search query 101 are the text displayed on the query card 134a (e.g., "call a taxi"). In other implementations, the query terms of the selected search query 101 are terms that define a broad action corresponding to the text displayed on the query card 134a (e.g., "make a taxi reservation"). Alternatively, the selected search query 101 can contain a query ID that references a known search query 100 that implicates software applications that perform the broad action (e.g., help a user call a taxi). In some implementations, the user device 300 includes one or more context parameters in the selected search query 101 (e.g., geolocation of the user device 300, an operating system type of the user device 300, a username of the user, etc.). In some implementations, the query card 134 includes instructions or rules that indicate which context parameters to include (e.g., a geolocation of the user device 300, a username, or an operating system type of the user device 300). In response to the selected search query 101, the search engine 200 provides new search results 130, as shown in FIG. 1C. The new search results 130 include application cards 132 that are responsive to the selected search query 101. In the illustrated example, the application cards 132a, 132d, 132e allow a user to use or install an application that assists the user to obtain taxi services.

FIG. 1D illustrates another example of a user device 300 displaying a search engine results page (SERP). In the illustrated example, the user device 300 is displaying three application cards 132f, 132g, 132h and a query card 134b in response to the search query 100 "visit San Francisco." The application cards 132f, 132g, 132h include user selectable links 144 that allow a user to either download or launch travel related applications. In this example, the query card 134b is configured to receive additional input parameters. The illustrated query card 134 includes text input elements 142a, drop down menus 142b, calendar input elements 142c, and toggle boxes 142d. The query card 134, however, may include additional or alternative types of input elements 142 not shown. The user can input one or more input parameters into one or more of the input elements 142 and select the search command (a user selectable link 144) to send a selected search query 101 to the search engine 200. The user device 300 generates the selected search query 101 using a predetermined search query or query ID and the input parameters provided by the user.

In this example, the query card 134 allows a user to verify that he or she is looking to make a flight reservation. If the user does intend to shop for a flight, the user can leave the input elements empty and merely press the "Find A Flight?" element 140. In this scenario, selection of the query card 134 causes the user device 300 to transmit a selected search query 101 to the search engine 200 (e.g., "find flights to San Francisco," "find flights," or a query ID relating to a query for finding flights) without any additional input parameters. Alternatively, the user can provide one or more input parameters into the input elements 142. In this example, the user has entered a departure airport code ("DTW"), an arrival airport code ("SFO"), a departure date ("Mar. 9, 2015"), a return date ("Mar. 14, 2015"), a fare class ("economy"), and a number of passengers ("1"). Upon entering the input parameters and selecting (e.g. pressing) the "Find A Flight?" element, the user device 300 generates a selected search query 101 based on the inputted parameters and a set of predetermined query terms associated with the query card 134 (e.g., "find flight") or a query ID associated with the query card 134. For example, the user device 300 can transmit the following selected search query 101 to the search engine 200: "make a flight reservation for one passenger departing from DTW on Mar. 9, 2014 to SFO, returning on Mar. 15, 2014, and flying economy." While the foregoing example selected search query 101 is a natural language search query, the user device 300 may generate a more structured selected search query 101 (e.g., "Query ID=1234; Dept=DTW; Arr=SFO; Dep_Date=3/9/2014; Ret_Date=3/15/2014; Fare_Class=Economy; Passengers=1," where Query ID 1234 corresponds to the broad action "making a flight reservation"). In some implementations, the user device 300 further includes context parameters with the selected search query 101 (e.g., geolocation, username, an operating system of the user device 300).

The search engine 200 provides new search results 130 in response to the selected search query 101. FIG. 1E illustrates an example of the user device 300 depicted in FIG. 1D displaying the new search results 130 that are in response to the selected search query 101. The new search results 130 include two application cards 132i, 132j. In this scenario, the application cards 132i, 132j are user selectable links 144 that recite the input parameters provided via the query card 134b by the user. As will be discussed, the search engine 200 includes one or more access mechanisms in each respective application card 132 that the user device 300 can utilize to launch a native application (or a web application) to a state of the application that is based on the input parameters (which may be displayed in the application card 132). Thus, when the user selects (e.g., presses) the user selectable link 144, the user device 300 launches the selected application to a state or function defined by an access mechanism, which incorporates the input parameters. For example, if the user selects the first application card 132*i*, the user device 300 can launch the application indicated by the application card 132*i* (e.g., "TravelZoom") and can provide the input parameters displayed in application card 132*i* to the application (e.g., departure city, arrival city, dates of travel, passengers, etc.).

FIGS. 1F-1I illustrate additional or alternative examples relating to query cards 134. According to some implementations, a query card 134 may be shown in two modes, including a collapsed viewing mode and an expanded viewing mode. FIG. 1F illustrates example search results 130 that include a query card 134*c* being displayed in a collapsed viewing mode. When displayed in a collapsed viewing mode, a query card 134*c* may exclude some of the displayed elements 140 of the query card 134 and some or all of the input elements 142 of the query card 134. In the illustrated example, the query card 134*c* indicates that the query card 134 can be used to narrow the user's intent to calling a taxi. In this example, the query card 134*c* includes a resize element 146, whereby when the user selects the resize element 146, the user device 300 resizes the query card 134*c* and displays the query card 134*c* in an expanded viewing mode. Additionally or alternatively, the user can resize the query card 134*c* by selecting (e.g., pressing on) any portion of the query card 134*c*. In FIG. 1G, the user device 300 displays the query card 134*c* in an expanded viewing mode in response to selection of the resize element 146 shown in FIG. 1F. When displayed in an expanded viewing mode, the query card 134 includes all of the displayed elements 140 of the query card 134 and all of the input elements 142 of the query card 134. In this way, the amount of real estate on the screen devoted to a query card 134 can be reduced until the user determines that the query card 134 is relevant to his or her intentions. In this example, the query card 134 includes text input elements 142*a* related to making a taxi reservation (e.g., pickup location, drop off location, and a pickup time).

In some implementations, the user device 300 displays a selected search query 101 (or one or more representative query terms) and the input elements 142 in the search bar 110 in response to the user beginning to populate a query card 134. FIG. 1H illustrates an example of the user device 300 displaying input elements in the search bar 110. In this example, the user selected the query card 134*c* illustrated in FIG. 1G. In response to the user selection of the query card 134*c*, the user device 300 displays terms representing a broad action (e.g., "call a taxi") and one or more input elements 142 (e.g., text input elements 142*a* for entering a pickup location, drop off location, and a pickup time). Furthermore, in some scenarios, the user device 300 prepopulates one or more of the input elements 142 with a best guess. In this example, the user device 300 sets the pickup location input element to "my location" and the pickup time input element to "now." The search engine 200 may determine these "best guesses" in any suitable manner. In some implementations, the search engine 200 bases the best guess(es) on previous behaviors of users. For example, if users who select the "call a taxi" service typically set the pickup location to a current location (e.g., my location) and the pickup time to a current time (e.g., now), then the search engine 200 learns these best guesses and pre-populates the input fields with these best guesses. In this way, the user can initiate a selected search query 101 using the pre-populated input parameters without having to ever enter any input parameters.

In FIG. 1I, the user has decided to enter a drop off location input parameter. The user selects the drop off location text input element 142*a*. In some implementations, the user device 300 populates the text input element 142*a* with best guesses based on the user's history. In this example, the user device 300 auto-suggests the location "278 Castro St." This may result from the user previously having entered this address into an input element 142 that receives addresses or the address being a stored address in the user's contacts that are stored on the user device 300.

In the examples of FIGS. 1F-1I, the user device 300 can perform "incremental searches" as the user inputs information. As the user interacts with the query card 134*c* or the input parameters shown in the search bar 110, the user device 300 updates the application cards 132 shown in the search results 130. For example, as the user enters a drop off location, the user device can populate the application cards 132 to reflect the newly inputted parameters. In the example of FIG. 1I, the user has entered the address "278 Castro St." into the query card 134*c* by selecting the address from a drop down menu displayed in the query card 134. Upon the user selecting the address, the user device 300 transmits the selection to the search engine 200. The search engine 200, in response, updates the application cards 132*a*, 132*d*, 132*e* to indicate the newly entered address. The search engine 200 can send updated result objects indicating the newly entered address and/or can transmit an instruction to the user device 300 to update the application cards 132 to reflect the newly entered address. The updated result objects or the instructions may further include one or more updated access mechanisms that reflect the newly entered address (e.g., the access mechanisms include a drop-off parameter that indicates the entered address).

In some implementations, the search engine 200 bases a query card 134 on one or more query terms in the search query 100. FIG. 1J illustrates an example of one such query card 134. In this example, the user provided the search query 100 "the big lebowski", which is the title of a movie and may be a known parameter or entity. The search results 130 include application cards 132 that link to states of third-party applications that are somehow related to the entity "The Big Lebowski." The search results 130 may further include a query card 134 that corresponds to streaming the movie "The Big Lebowski." In response to the selection of the query card 134, the search engine 200 returns search results 130 that are directed to streaming "The Big Lebowski" (see e.g., FIG. 1K). In these implementations, the search engine 200 may also be configured to prepopulate input elements based on the search query 100. For instance, if the user in the example of FIG. D enters the query "flights to SFO," the value of "SFO" may be prepopulated into the text input element that defines the destination or arrival airport.

FIGS. 1B-1K are provided for example and not intended to limit the scope of the disclosure. Additional implementations and use cases are contemplated and are within the scope of the disclosure.

FIGS. 2A-2F illustrate an example search engine 200 and data flows thereof. The search engine 200 can include, but is not limited to a processing device 210, a storage device 230, and a network interface device 280. In some implementations, the search engine 200 is incorporated in a larger search system (not shown) that includes an advertising engine and/or other engines. For purposes of discussion, the search engine 200 is described as performing functional searches.

The processing device 210 can include memory (e.g., RAM and/or ROM) that stores computer executable instructions and one or more processors that execute the computer executable instructions. In implementations of two or more processors, the processors can operate in an individual or distributed manner. In these implementations, the processors can be arranged in a single computing device or across multiple computing devices (e.g., rack-mounted servers). The processing device 210 can execute a search module 212, a query intent module 214, and a results processing module 216.

The network interface device 280 includes one or more devices that can perform wired or wireless (e.g., Wi-Fi or cellular) communication. Examples of the network interface device 280 include, but are not limited to, a transceiver configured to perform communications using the IEEE 802.11 wireless standard, an Ethernet port, a wireless transmitter, and a universal serial bus (USB) port.

The storage device 230 can include one or more computer readable storage mediums (e.g., hard disk drives and/or flash memory drives). The storage mediums can be located at the same physical location or at different physical locations (e.g., different servers and/or different data centers). In the illustrated example, the storage device 230 stores a function record data store 240, a query intent data store 250, a type data store 260, and/or a layout file data store 270. The storage device 230 may store any other suitable data stores.

Figure 2A:
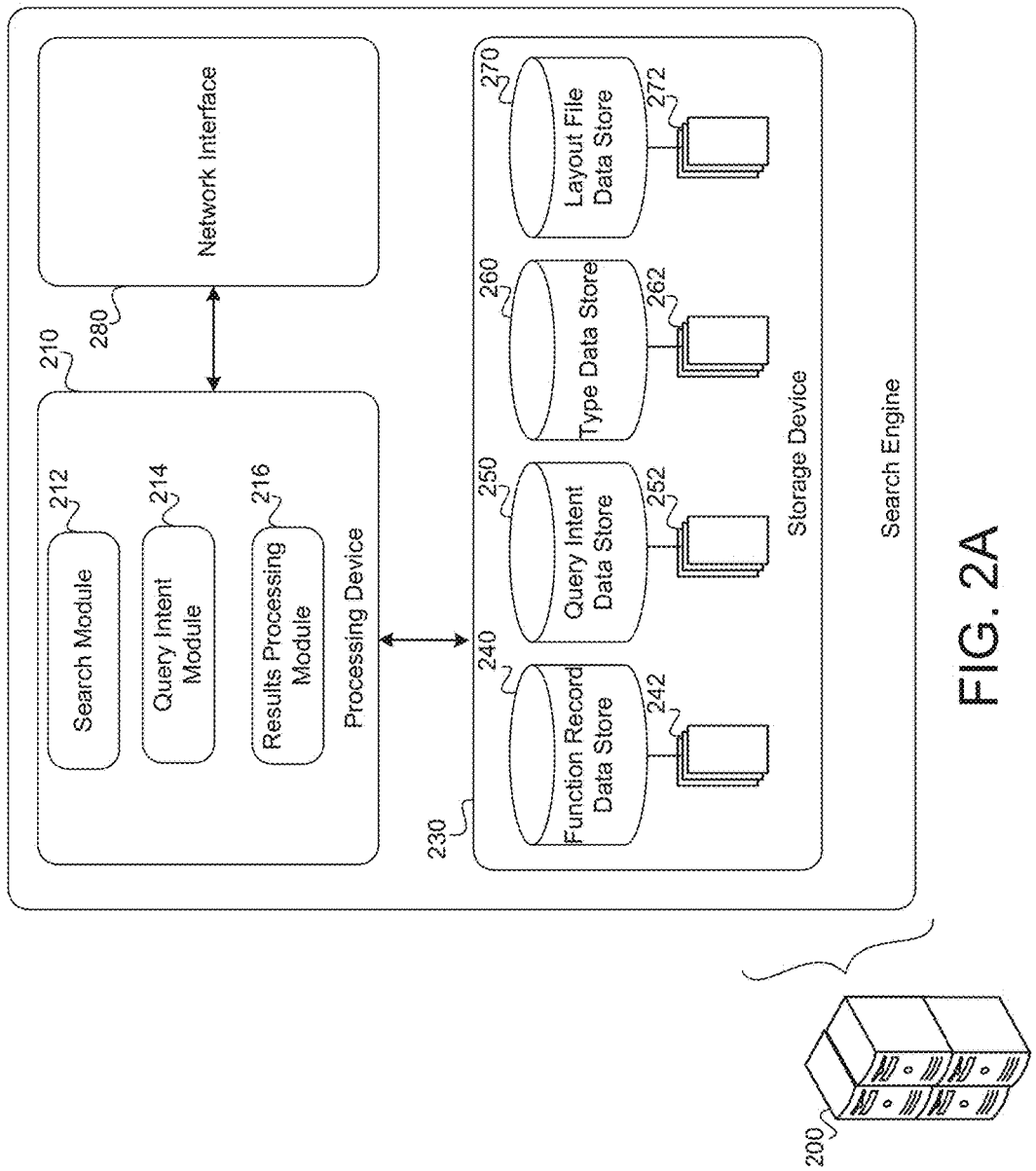
FIG. 2A is a schematic view of example components of a search engine.
Figure 2C:
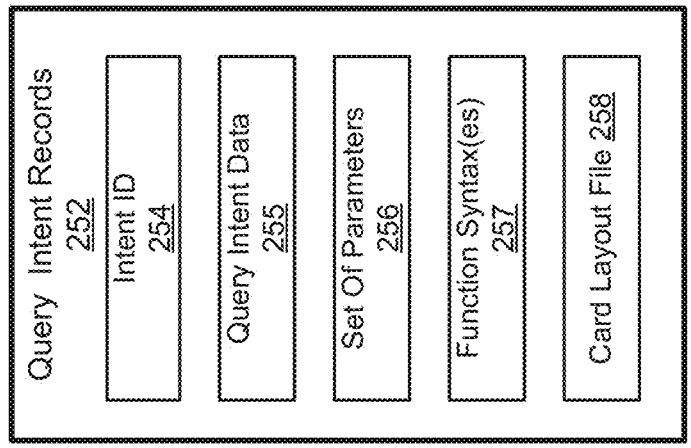
FIGS. 2B and 2C are schematics illustrating example components of a function record and query intent records, respectively.
Figure 2B:
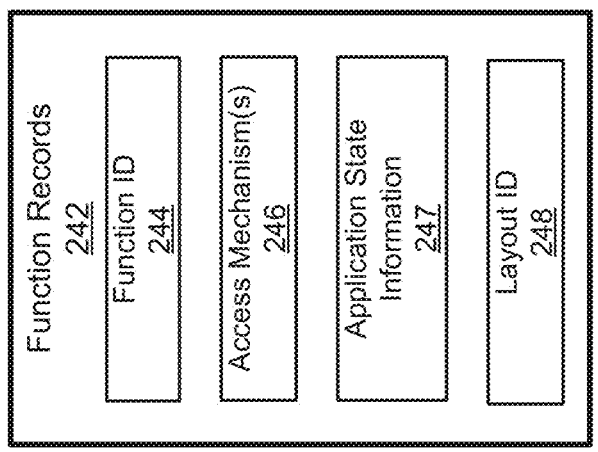

The function record data store 240 stores function records 242. The function record data store 240 may include one or more databases, indices (e.g., inverted indices), tables, files, or other data structures, which may be used to implement the techniques of the present disclosure. Each function record 242 may include data related to a function of an application and/or the state of the application resulting from performance of the function. FIG. 2B illustrates an example of a function record 242. A function record 242 may include a function identifier ("function ID") 244, one or more access mechanisms 246, application state information 247, and a layout identifier 248 ("layout ID").

A function ID 244 can identify a function record 242 among the other function records 242 included in the function record data store 240. Furthermore, a function ID 244 can identify a state of a software application and can be used to generate one or more access mechanisms for accessing the state. A function ID 244 is a string of alphabetic, numeric, and/or symbolic characters (e.g., punctuation marks) that uniquely identifies the state of the application. In some implementations, a function ID 244 is in the format of a resource identifier. For example, the function ID 244 may be a uniform recourse locator (URL) or an application resource identifier. In these implementations, the function ID 244 may be used by a user device to access a software application via a web application edition or one or more native application editions of the software application, respectively. In some implementations, a function ID 244 maps to one or more access mechanisms. In these implementations, a function ID 244 may map to a web resource identifier (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be: www.exampleapp.com/param1=abc¶m2=xyx, the first application resource identifier may be android.exampleapp::param1=abc¶m2=xyx, and the second application resource identifier may be windows.exampleapp::param1=abc¶m2=xyx. In this example, a function ID 244 may map to the web resource identifier and the two application resource identifiers. A function ID 244 may have a URL-like structure that utilizes a namespace other than http://, such as "func://", which indicates that the string is a function ID 244. In the example of "exampleapp" above, the function ID 244 corresponding to the example state may be: func://exampleapp::param1=abc¶m2=xyx, which maps to the access mechanisms described above. In another example, a function ID 244 may take the form of a parameterizable function. For instance, a function ID 244 may be in the form of "app_id[action(parameter_1, . . . , parameter_n)]", where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 244 may be "exampleapp[example_action(abc, xyz)]". Given this function ID 244 and the referencing schema of the example application, the foregoing function ID 244 may be used to generate the access mechanisms defined above. Additionally or alternatively, the above example function ID 244 may map to the access mechanisms defined above. Furthermore, while function IDs 244 have been described with respect to resource identifiers, a function ID 244 may map to one or more scripts that access a state of a software application or may be utilized to generate one or more scripts that access a state of the software application. Some software applications may have a common scheme for accessing all of their respective native application editions. In such scenarios, a single application resource identifier may access multiple application editions. Further, a function ID 244 may take any other suitable format. For example, the function ID 244 may be a human-readable string that describes the state of the application to which the function ID 244 corresponds.

In some scenarios, a function ID 244 may be unparameterized, such that the function ID 244 may be parameterized based on input parameters provided by a user. In these scenarios, the function ID 244 can identify the application, the action, and the parameters that the function ID receives, but the parameters are not assigned any values. For example, an unparameterized function ID 244 corresponding to the exampleapp may take the form: exampleapp[example_action(param_1, param_2)]. In the example of making a taxi reservation on the SuperTaxi software application, an unparameterized function ID 244 may take the form: SuperTaxi[request_taxi(pickup_location, drop_off_location, time)]. In this way, the function ID 244 can be parameterized with values provided by the user (e.g., in a query card 134). The parameterized function ID 244 can be used to generate access mechanisms for accessing a state of the SuperTaxi application that depends on the inputted parameter values. Unparameterized function IDs 244 may be used to identify a function record 242 of a state of a software application that receives input parameters from a user (e.g., a state where a user can make flight reservations, search for a type of cuisine, or request a taxi). Additionally or alternatively, unparameterized function IDs 244 may be used to generate parameterized function IDs 244 when a user inputs one or more values into an application card 132 and selects the application card 132.

A function record 242 includes access mechanism data 246. Access mechanism data 246 can include one or more access mechanisms 246 that can be used to access the state identified by the function ID 244 stored in the function record 242. The access mechanism(s) may include one or more application access mechanisms, one or more web access mechanisms, one or more application download addresses, and/or one or more scripts. A user device 300 utilizes the access mechanisms stored in the function record 242 to access the state or function of the application to which the function record 242 corresponds. Additionally or alternatively, access mechanism data 246 can define rules and/or templates for generating access mechanisms given a function ID 244. For instance, the templates can include an unparameterized access mechanism that includes one or more fields that receive respective parameter types. The rules can define a manner by which to populate the fields, given a set of parameter values. In this way, when the search engine 200 receives a selected search query 101 and generates a new function ID 244, the search engine 200 can generation one or more access mechanisms based on the function ID 244 and the access mechanism data 246.

The application state information 247 may include data that describes a state or function to which the function record 242 corresponds. The application state information 247 may include a variety of different types of data. The application state information 247 may include structured, semi-structured, and/or unstructured data. In some implementations, the search engine 200 extracts and/or infers the application state information 247 from documents retrieved from various data sources. For example, the search engine 200 may crawl various sources, such as digital distribution platforms, websites of application developers, reviews of applications, the applications themselves (native applications and/or web applications), and any other suitable data sources to obtain the application state information 247. Additionally or alternatively, the application state information 247 may be human curated. In some examples, the application state information 247 includes data that an application presents to a user when the application is set in the application state defined by the access mechanism(s) 246 stored in the function record 242. For example, if the function record 242 is associated with a shopping application, the application state information 247 may include data that describes a product (e.g., product name, product seller, product description, and prices) that is shown when the shopping application is set to the application state defined by the access mechanism(s) 246. As another example, if the function record 242 is associated with a music player application, the application state information 247 may include data that describes a song (e.g., name of the song, album of the song, artist, reviews of the song, etc.) that is played when the music player application is set to the application state defined by the access mechanism(s) 246. Furthermore, the application state information 247 may include information that describes the application itself. For example, the application state information 247 may include a name of the application, a developer of the application, and the platforms for which the application is developed (e.g., web-based, IOS, ANDROID, FIRE OS, etc.).

The types of data included in the application state information 247 may depend on the type of information associated with the application state and the functionality of the application. In one example, if the function record 242 is for an application that provides reviews of restaurants, the application state information 247 may include information (e.g., text and numbers) related to a restaurant, such as a name of the restaurant, a category of the restaurant, actual reviews of the restaurant, ratings of the restaurant, an address of the restaurant, hours of operation of the restaurant, and a menu for the restaurant. As another example, if the function record 242 is for an application that plays music, the application state information 247 may include information related to a song, such as the name of the song, the artist, lyrics, and listener reviews and/or ratings. In some implementations, such data is structured in predetermined fields to help facilitate the generation of result objects that are transmitted in the search results 130.

In some implementations, the application state information 247 further includes what parameter types, if any, the application receives at a given state or when performing a particular function. For instance, if an application state corresponds to a travel application's flight booking function, the application state information 247 may include the following parameter types: a Boolean round trip parameter, a departure location (geolocation or a string designating an airport code), an arrival location (geolocation or a string designating an airport code), a departure date, a return date, an integer indicating a number of passengers, and a seat type (e.g., business class, first class, economy). In another example, if an application state corresponds to creating a calendar event functionality, the application state information 247 may include the following parameter types: a string indicating an event name, a time parameter indicating a start time, a time parameter indicating an end time, a string indicating guests or invitees, and a frequency parameter that indicates the days or dates to which the calendar event pertains (e.g., Monday thru Friday, the first of every month, etc.).

The layout ID 248 identifies a layout file that is used to generate a result object containing an application card 132 corresponding to the function record 242. As will be discussed, different application cards 132 can be rendered to have different looks, feels, and functionalities. For instance, some application cards 132 may have an icon embedded therein, while other application cards 132 may contain only text. Thus, the layout ID 248 instructs the results processing module 216, which layout file to use when generating a result object corresponding to the function record 242.

The query intent data store 250 stores query intent records 252. The query intent data store 250 may include one or more databases, indices (e.g., inverted indices), tables, files, or other data structures, which may be used to implement the techniques of the present disclosure. Each query intent record 252 may include data related to known actions of users. An action can refer to a broad action that users may desire to perform. For example, broad actions can include making a flight reservation, making a hotel reservation, calling a taxi, generating and sending a calendar invite, making a restaurant reservation, finding a restaurant, messaging a contact, or finding driving instructions. FIG. 2C illustrates an example of a query intent record 252. A query intent record 252 may include an intent identifier 254 ("intent ID"), query intent data 255, a set of parameters 256, one or more function syntaxes 257, and a query card layout file 258.

The intent ID 254 uniquely identifies the query intent record 252 from other query intent records 252. The intent ID 254 is an alphanumeric string containing letters, numbers, and/or symbols. In some examples, the intent ID 254 describes a broad action or a selected search query 101. For example, the intent ID 254 may include the query terms in the selected search query 101 or the name of a broad action (e.g., "make a flight reservation"). In some examples, the intent ID 254 includes a string in the format of or similar to a uniform resource locator (URL) of a web access mechanism, whereby the string includes a domain name or IP address of the search engine 200. In other examples, the intent ID 254 may include a URL using a namespace other than "http://," such as "func://," which may indicate that the URL is being used as an intent ID 254. In some implementations, the intent ID 254 is used as a query ID.

Query intent data 255 includes any data that describes or relates to the action corresponding to the query intent record 252. Query intent data 255 can include, but is not limited to, triggering data and visual data. Triggering data can include any data that can index the query intent record 252 so that the query intent module 214 can identify the query intent record 252 from the other query intent records 252. In some implementations, triggering data includes keywords that relate to the broad action defined by the query intent record 252. For example, the keywords can include a textual representation of the broad action itself, synonyms thereof, names of applications known to relate to the broad action, and any terms normally associated with the broad action. In one example, the keywords for a query intent record 252 for the broad action "making a flight reservation" can include "making a flight reservation," "find a flight," "plane tickets," "fly to," "travel to," "visit," airport codes, city names, country names, and any other relevant terms or phrases relating to finding or booking a flight. Visual data can include any data that the user device 300 can display in a corresponding query card 134. For example, visual data can include, for example, an icon that is indicative of the broad action (e.g., a taxi sign for "call a cab" or a fork and knife for "find a restaurant"). In some implementations, the query intent data 255 also includes a set of one or more query terms that make up a selected search query 101 corresponding to the query intent record 252. For example, the query intent data 255 can include query terms that define the broad action defined by the query intent record 252. Furthermore, the query intent data 255 can include a template that includes the set of query terms as well as fields that receive values of input parameters, whereby a natural language selected search query 101 can be generated using the template. In some implementations, the query intent data 255 includes a query ID, which may point to the set of query terms.

In some implementations, the query intent data 255 further includes a set of function IDs 244 of function records 242 that correspond to the broad action defined by the query intent record 252. In these implementations, the set of function IDs identify function records 242 that can perform the function defined by the broad action. For instance, if a broad action is "calling a taxi," the set of function IDs 244 may identify function records 242 that include access mechanisms to states of applications that allow a user to call a taxi.

In implementations where a query card 134 can be configured to receive input parameters, a query intent record 252 includes a set of parameters 256. A set of parameters 256 indicates the types of parameters that are typically associated with the broad action. Put another way, the set of parameters 256 indicates the types of parameters that a resultant query card 134 can receive from a user. Each parameter can include a name of the parameter and its corresponding data type.

Also in implementations where a query card 134 can be configured to receive input parameters, a query intent record 252 can include one or more function syntaxes 257. A function syntax 257 is a mechanism that the search engine 200 can utilize to translate a set of input parameters into a format that is compatible with a third party software application. Each function syntax 257 can define a reference to a third party application (e.g., a name or other identifier of the application) and an argument mapping scheme. An argument mapping scheme is a specification that maps each of the parameters in the set of parameters 256 to a syntax or format that is compatible with the corresponding application. In this way, a function syntax 257 can receive any subset of parameters defined in the set of parameters 256 and can output a function ID 244 that is compatible with the application. For instance, in some implementations, a function syntax 257 includes templates, instructions, and/or rules that the search engine 200 utilizes to generate function IDs 244 based on one or more received input parameters. Additionally or alternatively, a function syntax 257 may be an unparameterized function ID 244. In such implementations, the function syntax 257 can be used to generate a function ID 244 by parameterizing the function syntax 257 (i.e., an unparameterized ID) with the input parameters received with a selected search query 101. In these implementations, a function syntax 257 can receive a set of values provided by the user as a set of input parameters in a selected search query 101 and can generate a function ID 244 by parameterizing the unparameterized function ID 244 with the received value(s). The generated function ID 244 can be used to generate one or more access mechanisms that launch a respective edition of the software application indicated by the function ID 244. The query intent record 252 may store function syntaxes 257 for multiple third-party applications. For example, if multiple third party applications are known to perform a broad action (e.g., "making a flight reservation" or "purchasing event tickets"), the query intent record 252 can store a function syntax 257 for each of the multiple third party software applications. Thus, the search engine 200 can utilize the function syntaxes 257 to ultimately generate access mechanisms that are included in the individual search results 130. The function syntaxes 257 may be provided by application developers, developed by the search engine provider, and/or learned by the search engine 200 by analyzing the access mechanisms used to access the third party applications.

A card layout file 258 is a file containing instructions for rendering a query card 134 corresponding to the query intent record 252. The card layout file 258 can define the look and feel of the query card 134. For example, the card layout file 258 can define locations where displayed elements 140 and/or input elements 142 appear in the query card 134 and styles that are used in the query card 134 (e.g., fonts, font sizes, colors). Furthermore, in some implementations, the card layout file 258 defines multiple layouts of the query card 134 corresponding to different viewing modes (e.g., expanded viewing mode and collapsed viewing mode). In this way, a query card 134 can be displayed in multiple viewing modes. In some implementations, the query intent record 252 stores a card layout ID instead of the actual card layout file 258. In these implementations the card layout ID points to a layout file stored in the layout file data store 270.

The type data store 260 stores parameter records 262 for different types of parameters. Each parameter record 262 can correspond to a different type of parameter. The parameter record 262 can define the data type of the parameter, applications that accept the parameter, and common keywords associated with the parameter. A parameter record 262 can include additional information relating to its parameter. For instance, for each software application that receives a parameter, the parameter record can define the syntax used by the software application with respect to the parameter.

The layout file data store 270 stores layout records 272. Each layout record 272 can include a layout ID and a layout file. A user device 300 utilizes a layout file to render a card (e.g., an application card 132). The layout files can be templates. The templates can define instructions and data that the results processing module 216 utilizes to generate result objects that contain application cards 132 or query cards 134. During the execution of a search, the results processing module 216 can retrieve a particular layout file using its corresponding layout ID and can insert data into the layout file that can be rendered in the displayed card.

Figure 2D:
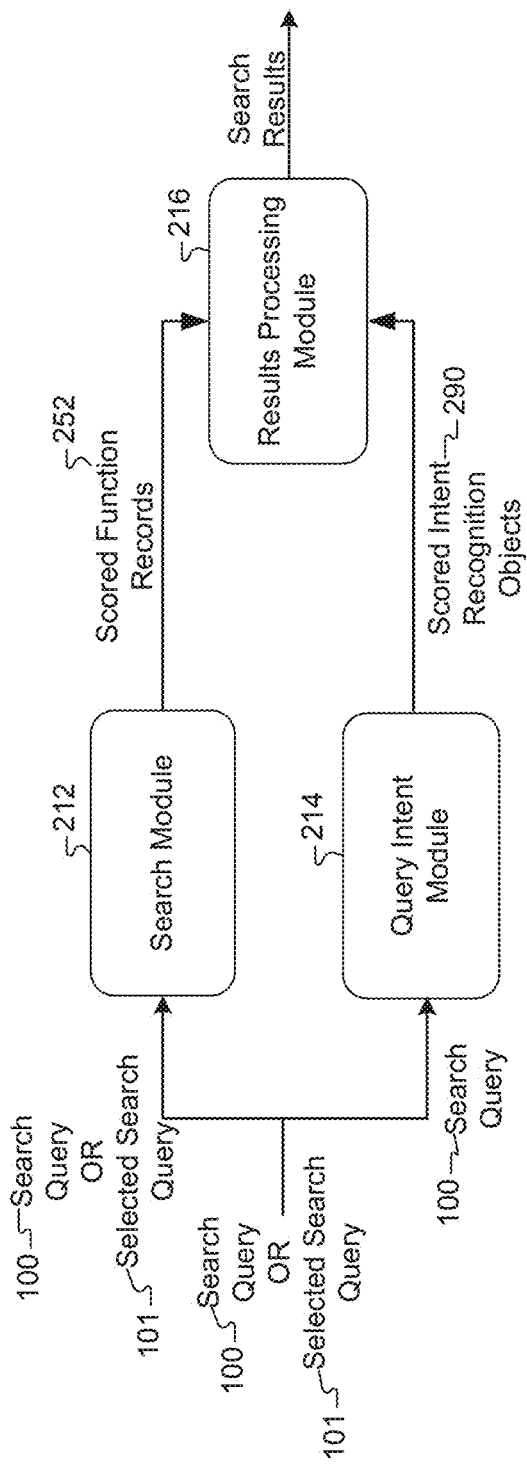
FIG. 2D is a schematic view of an example data flow of the search engine when processing a search query.

FIG. 2D illustrates an example data flow exchange between the search module 212, query intent module 214, and the results processing module 216. In the illustrated example, the search module 212 can initially receive a search query 100 and outputs a set of scored function IDs 244. The scored function IDs 244 are representative of one or more function records 242 that may be relevant to the search query 100. Each function ID 244 has a result score associated therewith, the result score being indicative of a degree of relevance of the function record 242 with respect to the search query 100. Put another way, the result score of a function ID 244 indicates how relevant the state of a software application identified by the function ID 244 is to the search query 100. In some implementations, the search module 212 outputs scored function records 242 instead of the scored function IDs 244 of the function records 242.

The query intent module 214 also receives the search query 100 and outputs a set of scored intent recognition objects 290. Each scored intent recognition object 290 corresponds to a different query intent record 252. The scored intent recognition objects 290 are each representative of an action (e.g., a broad action defined by a query intent record 252) and can include zero or more parameters identified from the search query 100. Each scored intent recognition object 290 has an intent score associated therewith, the intent score being indicative of a degree of likelihood that the search query 100 corresponds to the scored intent recognition object 290 (e.g. the broad action described in the corresponding query intent record 252). Put another way, the intent score of a scored intent recognition objects 290 may indicate how likely it is that the user who provided the search query 100 wants to leverage the action defined in the query intent record 252. In some implementations, the set of scored intent recognition objects 290 may be pointers (e.g., query IDs) that uniquely identify the scored intent records 252 rather than the scored objects 290 themselves.

The results processing module 216 receives the scored function IDs 244 and the scored intent recognition object 290 and outputs search results 130, which are transmitted to the user device 300. The results processing module 216 determines which, if any, application cards 132 and which, if any, query cards 134 to include in the search results 130 based on the scored function IDs 244 and the scored intent recognition objects 290. In some implementations, the results processing module 216 further determines how each card 132, 134 is to be displayed in the search results 130 (e.g., the size of each card 132, 134 and/or the ranking of each card 132, 134) based on the scored function IDs 244 and the scored intent recognition objects 290. Once the results processing module 216 has determined which application cards 132 and query cards 134 to include in the search results 130, the results processing module 216 generates the application cards 132 and query cards 134. The results processing module 216 can retrieve the layout files 258 corresponding to the selected function records 242 and query intent records 252 and can generate respective application cards 132 and query cards 134 based thereon. Each card 132, 134 may be encoded in a respective result object, whereby the collection of result objects make up the search results 130. The results processing module 216 can transmit the search results 130 to the user device 300 that provided the search query 100.

In some scenarios, the user selects a query card 134 displayed in the search results 130. In these scenarios the user device 300 transmits a selected search query 101 to the search engine 200. The selected search query 101 may be a structured query or an unstructured query. In implementations where the selected search query 101 is a structured query, the selected search query 101 can include a query ID (which indicates the broad action). Further, in some implementations, the selected search query 101 also includes one or more parameter fields that have been assigned values (i.e., the input parameters) based on user input into the selected query card 134. In implementations where the selected search query 101 is unstructured, the selected search query 101 is a set of query terms that indicate the broad action. Further, if the query card 134 receives input parameters, the query terms may further include inputted parameters in, for example, a natural language format. Put another way, in unstructured selected search queries 101, the user device 300 can generate a natural language selected search query 101 that is based on a broad action corresponding to the query card 134, the inputted parameters, and any contextual terms (e.g., to, from, for) to provide additional context to the selected search query 101. Furthermore, the user device 300 may further include context parameters with the selected search query 101. For example, the user device 300 may communicate a geolocation of the user device 300 and/or an operating system type of the user device 300.

The search module 212 receives the selected search query 101 and outputs another scored set of function IDs 244. During this iteration, the search module 212 has the benefit of knowing what the broad action is and in some cases additional input parameters to help increase the relevance of the scored function IDs 244. The search module 212 provides the second set of function IDs 244 to the results processing module 216, which generates new search results 130 based thereon. The new search results 130 can be provided to the user device 300.

Figure 2E:
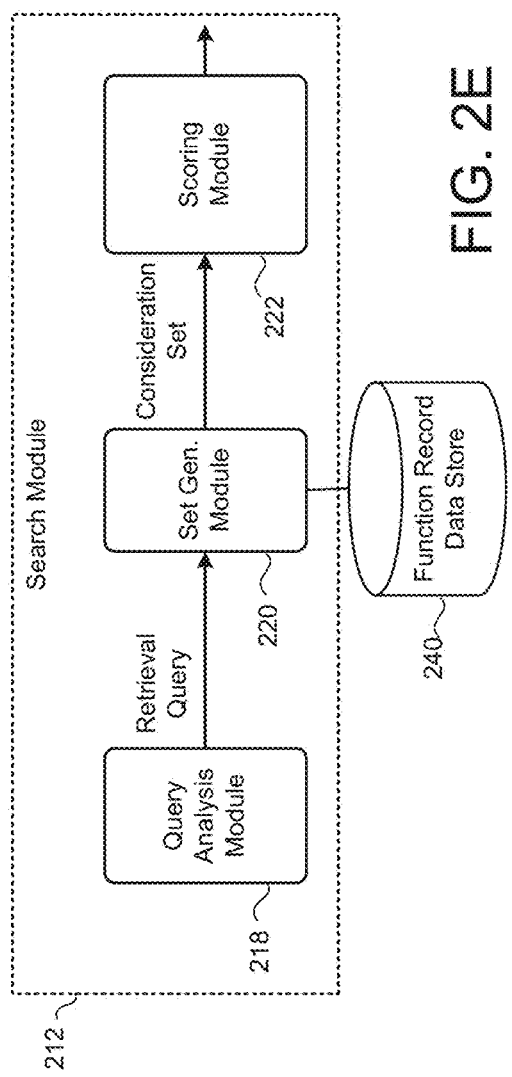
FIG. 2E is a schematic view of example components of a search module of the search engine.
Figure 2F:
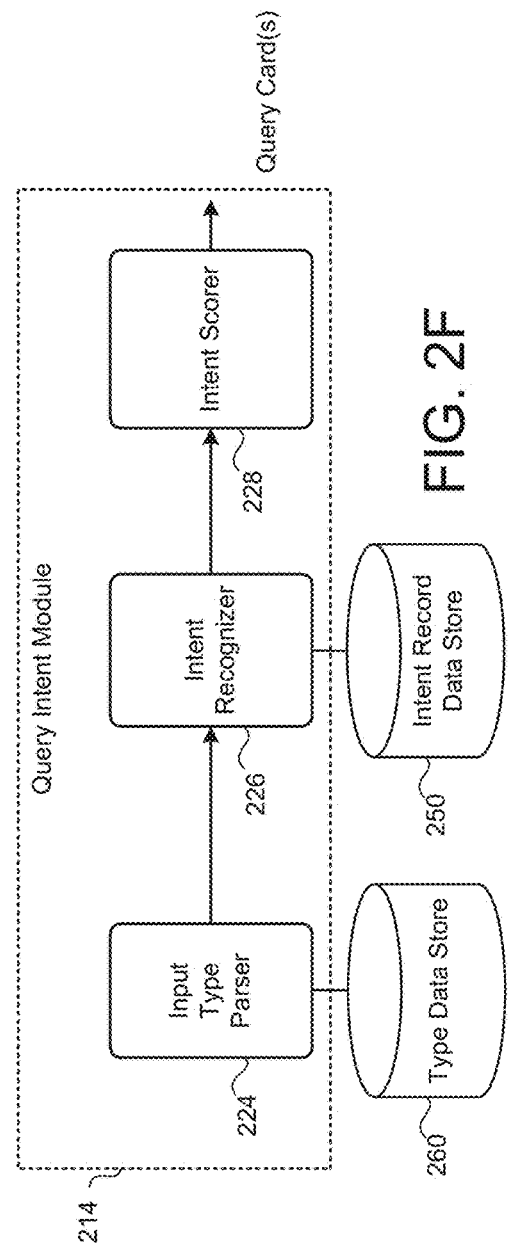
FIG. 2F is a schematic view of example components of a query intent module of the search engine.

FIGS. 2E-2F respectively illustrate example components of the search module 212 and the query intent module 214. In the example of FIG. 2E, the example search module 212 includes a query analysis module 218, a set generation module 220, and a record scoring module 222. The query analysis module 218 receives search queries 100 and/or selected search queries 101 and outputs tokens based thereon. The set generation module 220 receives the tokens and identifies a consideration set of function records 242 (referred to as a "consideration set of records") based on the tokens. The consideration set of records may contain actual function records 242 or the function IDs 244 thereof. The record scoring module 222 receives the consideration set of records and scores each function record 242 identified in the consideration set. The record scoring module 222 can attribute the score of a function record 242 to its function ID 244. The scored function IDs 244 are output to the results processing module 216. The operation of the search module 212 is described in greater detail below.

The query analysis module 218 receives a search query 100 or a selected search query 101, and in some implementations, context parameters (e.g., geolocation of a user device 300 or an operating system type of the user device 300). When the query analysis module 218 receives a search query 100, the query analysis module 218 analyzes the query terms of the search query 100 and/or the context parameters. For example, the query analysis module 218 may perform various analysis operations on the query terms of the received search query 100. Example analysis operations may include, but are not limited to, tokenization of the search query 100, filtering of the search query 100, stemming the query terms of the search query 100, synonymization of the query terms, and stop word removal. In some implementations, the query analysis module 218 outputs tokens representing the search query 100.

In some implementations, the query analysis module 218 analyzes the selected search query 101 as if it were a search query 100. For example, in the case of an unstructured selected search query 101, the query analysis module 218 can tokenize, stem, synonymize the selected search query and remove any stop words therefrom. In the case of a structured selected search query 101, the selected search query 101 may contain a query ID rather than query terms. In such a scenario, the query analysis module 218 can lookup query terms that correspond to the query ID. For instance, the query analysis module 218 can retrieve the query intent record 252 corresponding to the query ID and can tokenize the broad action defined in the query intent record 252. The query analysis module 218 can further tokenize any additional inputted parameters that may have been included in the selected search query 101. Along with the resultant tokens, the query analysis module 218 can output the intent ID 254 of the query intent record 252 used to generate the selected query card 134 to the set generation module 220. In some implementations, the query analysis module 218 merely passes the intent ID 254 to the set generation module 220 along with any input parameters contained in the selected search query 101. In these implementations, the query analysis module 218 may tokenize any context parameters and/or input parameters provided with the selected search query 101 and provide the tokens to the set generation module 220.

The set generation module 220 identifies a consideration set of records based on the tokens provided by the query analysis module 218. As used herein, the term consideration set of records can refer to a list of function IDs 244 or the actual function records 242. In some examples, the set generation module 220 identifies the function records 242 based on matches between the tokens and terms contained in the function records 242. For example, the set generation module 220 may identify the function records 242 based on matches between tokens generated by the query analysis module 218 and terms included in the application state information 247. The set generation module 220 may further determine an initial score for each identified function record 242 (and not the result score of the record 242). In some implementations, the set generation module 220 utilizes the Apache Lucene libraries supported by the Apache Software Foundation to identify the consideration set and obtain the initial scores thereof.

In the scenario where the set generation module 220 receives a selected search query 101, the set generation module 220 determines a consideration set based on the selected search query 101 and any input parameters received with the selected search query 101, if any. The selected search query 101 may be structured (e.g. represented by a query ID) or unstructured (represented by a set of query terms), and may or may not be provided with a set of input parameters. In some implementations, the set generation module 220 receives a query ID of a selected search query 101 (e.g., the selected search query 101 is a structured query). In these implementations the set generation module 220 can retrieve the query intent record 252 corresponding to the intent ID 254 and identify the function syntaxes 257 in the query intent record 252. For each function syntax 257, the set generation module 220 can generate a function ID 244 based on the function syntax 257 and zero or more parameters. In some scenarios, the selected search query includes a set of input parameters, the values of which are provided by a user. In some implementations, the set generation module 220 generates the function ID 244 by parameterizing an unparameterized function ID 244 defined by the function syntax 257. In these implementations, the set generation module 220 sets the parameter values of the unparameterized function ID 244 to the values provided as the input parameters provided with the selected search query 101. For example, a query card 134 display the following action "make flight reservations" and may receive input parameters that correspond to the action of making a flight reservation (e.g., a departure city, an arrival city, a departure date, and a return date). The function syntaxes 257 in the query intent record 252 corresponding to the query card 134 may respectively include an unparameterized function ID 244 that leverages a flight reservation function of a respective third-party application given a set of input parameters (e.g., TravelZoom[find_flights(depart_city, arrive_city, depart_date, arrive_date)]. In response to receiving a selected search query 101 and a set of input parameters (e.g., "sfo," "dtw," "3/10/2015," "3/14/2015"), the set generation module can generate a set of function IDs 244 that include the following function ID 244 "TravelZoom[find_flights (sfo, dtw, 3/10/2015, 3/14/2015).] In implementations where the function syntax 257 defines a template and/or rules, the set generation module 220 generates the function IDs 244 according to the template and/or the rules defined in the function syntax 257 and using the values provided as input parameters with the received search query 101.

In scenarios where the selected search query 101 is not provided with input parameters, the set generation module 220 may identify function IDs 244 in any suitable manner. For instance, the set generation module 220 may lookup a set of function IDs 244 that correspond to the selected search query 101. In these implementations, the query intent record 252 may define the set of function IDs 244 that correspond to the selected search query 101. Additionally or alternatively, the set generation module 220 can search the function record data store 240 using query terms defined in the selected search query 101. In these implementations, the set generation module 220 can search the function record data store 240 in the manner described with respect to a search performed using the initial search query 100. Additionally or alternatively, the set generation module 220 can generate the function IDs 244 by parameterizing respective unparameterized function IDs 244 using information conveyed in the query intent record 252, the initial search query 100 (e.g., one or more query terms), and/or that was provided with the selected search query 101 (e.g., one or more query terms of the selected search query 101 and/or a geolocation of the user device 300). For example, in the case of the initial search query 100 "big lebowski" (e.g., FIGS. 1J-1K), the selected query card 134 may have displayed the following text "Stream The Big Lebowski." The query intent record 252 corresponding to the selected search query 101 may include a function syntax 257 corresponding to a media streaming software application. In an example, a first function syntax 257 defines the following unparameterized function ID: streamer_app[play_movie(Movie_Title)]. In response to the selected query card 134, the set generation module 220 may generate a function ID 244 by parameterizing the above-shown unparameterized function ID 244 with the value "the big lebowski" (e.g., streamer_app[play_movie("the big lebowski"). If a second function syntax 257 defined in the query intent record 252 corresponds to a movie information database software application, the function syntax 257 may define a second unparameterized function ID 244: movieDB[find_streams(movie_title)]. In response to the selected query card 134, the set generation module 234 may parameterize the second unparameterized function ID 244 with the value "the big lebowski" (e.g., movieDB[find_streams("the big lebowski")]. In both scenarios, the unparameterized function ID 244 was parameterized with a value provided in the initial search query 100 and that was used to generate the query 134—that is, "the big lebowski".

The scoring module 222 scores the function IDs 244 indicated by the consideration set. The scores associated with the function IDs 244 may be referred to as "result scores." The set processing module 216 may determine a result score for each of the function IDs 244. The result scores associated with a function record 242 may indicate the relative rank of relevance of the function ID 244 (e.g., the underlying state of the software application) among that of other function IDs 244. For example, a larger result score may indicate that an indicated state is more relevant to the search query 100 or selected search query 101. The information conveyed by the search results 130 may depend on how the result scores are calculated by the scoring module 222. For example, the result scores may indicate the relevance of an application state to the search query 100 or selected search query 101, the popularity of an application state, and/or other properties of the application state, depending on what attributes the scoring module 222 uses to score the function records 242.

The scoring module 222 may generate result scores for function IDs 244 in any suitable manner. In some implementations, the scoring module 222 generates a result score for a function ID 244 based on one or more scoring features. The scoring features may be associated with the function record 242 corresponding to the function ID 244, the function ID 244 itself, and/or the search query 100 (or selected search query 101). Examples of scoring features include, but are not limited to, function record scoring features, query scoring features, record-query scoring features, and function ID 244 scoring features.

A function record scoring feature (hereinafter "record scoring feature") may be based on any data associated with a function record 242. For example, record scoring features may be based on any data included in the application state information of the function record 242. Example record scoring features may be based on metrics associated with a person, place, or thing described in the function record 242. Example metrics may include the popularity of a place described in the function record 242 and/or ratings (e.g., user ratings) of the place described in the function record 242. In one example, if the function record 242 describes a song, a metric may be based on the popularity of the song described in the function record 242 and/or ratings (e.g., user ratings) of the song described in the function record 242. In another example, if the function record 242 describes a reservation function of a restaurant reservation application, the metrics may include the number of reviews the restaurant has received, the rating of the restaurant, and the overall popularity of the application (number of downloads). The record scoring features may also be based on measurements associated with the function record 242, such as how often the function record 242 is retrieved during a search and how often access mechanisms of the function record 242 are selected by a user when appearing in the search results 130. Record scoring features may also be based on whether the function record 242 includes an application access mechanism 246 that leads to a default state or a deeper native application state.

A function ID scoring feature may be based on determinations made with respect to a generated function ID 244. Function ID scoring features may be used as scoring features when a function ID 244 is generated in response to a selected search query 101. In some examples, function ID scoring features are based on how well a generated function ID 244 incorporates the received input parameters on which the function ID 244 was based and/or how many of the input parameters were used to generate the function ID 244. For example, a function ID scoring feature may be a value indicating how many input parameters were used to generate the function ID 244. Another example function ID scoring feature may indicate a ratio of the number of input parameters defined in the template or unparameterized function ID 244 that was used to generate the parameterized function ID 244 to the number of input parameters that were actually used to generate the function ID 244. The function ID scoring features may include additional or alternative features without departing from the scope of the disclosure.

A query scoring feature may include any data associated with the search query 100 or selected search query 101. For example, query scoring features may include, but are not limited to, a number of words in the search query 100 or selected search query 101, the popularity of the search query 100 or selected search query 101, and the expected frequency of the words in the search query 100 or selected search query 101. For example, if the search query 100 is "thai food", the metrics may include how many times or the rate at which the search query 100 is provided to the search engine 200. A record-query scoring feature may include any data generated based on data associated with both the function record 242 and the search query 100 or selected search query 101 that resulted in identification of the function record 242 by the set generation module 220. For example, record-query scoring features may include, but are not limited to, parameters that indicate how well the terms of the search query 100 or selected search query 101 match the terms of the application state information of the identified function record 242 (e.g., the initial score assigned to the function record by the set generation module 220).

The scoring module 222 may generate a result score for a function record 242 based on at least one of the record scoring features, function ID scoring features, the query scoring features, and/or the record-query scoring features. The scoring module 222 may determine a result score based on one or more of the scoring features listed herein and/or additional scoring features not explicitly listed. In some examples, the scoring module 222 includes one or more machine learned models (e.g., a supervised learning model) configured to receive one or more scoring features. The one or more machine learned models may generate result scores based on at least one of the record scoring features, the function ID scoring features, the query scoring features, and the record-query scoring features. For example, the scoring module 222 may pair the search query 100 (or selected search query 101) with each function ID 244 and calculate a vector of features for each (query, record) pair. The vector of features may include one or more record scoring features, one or more function ID scoring features, one or more query scoring features, and one or more record-query scoring features. In some implementations, the scoring module 222 normalizes the scoring features in the feature vector. As different function IDs 244 have different features (e.g., generated function IDs 244 have a different set of pertinent scoring features than function IDs 244 that identify stored function records 242), the scoring module 222 can generate feature vectors that have fields for all possible scoring features. In these implementations, the scoring module 222 can set the non-pertinent features to a null value or zero. For example, in a feature vector corresponding to a generated function ID 244, the record scoring features and the record-query scoring features can be set equal to null or zero. In a feature vector corresponding to an identified function ID 244, the scoring module 222 can set the function ID scoring features equal to null or zero. In this way, the feature vectors of function IDs 244 have the same set of features, despite the function IDs 244 not having the same types of features pertaining thereto.

In some implementations, the scoring module 222 inputs the vector of features into a machine-learned regression model to calculate a result score for the function ID 244. In some examples, the machine-learned regression model includes a set of decision trees (e.g., gradient boosted decision trees). In another example, the machine-learned regression model may include a logistic probability formula. In some examples, the machine learned task is framed as a semi-supervised learning task, where a minority of the training data is labeled with human curated scores and the rest are used without human labels. The scoring module 222 associates each calculated result score with the function ID 244 to which the calculated score corresponds. The scoring module 222 can provide the scored function IDs 244 to the results processing module 216.

FIG. 2F illustrates an example set of components of the query intent module 214. An example query intent module 214 includes an input type parser 224, an intent recognizer 226, and an intent scorer 228. In some implementations, the input type parser 224 parses the search query 100 and identifies an input parse object. An input parse object can include zero or more types of identified parameters in the search query 100 and one or more potential values of each parameter based on the query terms of the search query 100. The intent recognizer 226 receives the search query 100 and, in some implementations, any input parse objects identified by the input type parser 224 and outputs zero or more scored intent recognition objects 290. An intent recognition object 290 can include a query intent record 252 or the query intent IDs 254 thereof. The query intent record 252 is indicative of an action that may be implicated by the search query 100. Furthermore, each intent recognition object 290 can include zero or more recognized arguments. A recognized argument can include a name of a parameter that can be received and a typed value. The intent recognizer 226 can score each intent recognition object 290. The resulting score may be referred to as an "intent score." In some implementations, the intent score of an intent recognition object 290 is indicative of a degree of likelihood that the intention of the search query 100 relates to the action defined by the intent recognition object 290. In some implementations, an intent scorer 228 filters and ranks the scored intent recognition objects 290. The intent scorer 228 can output the scored intent recognition objects to the results processing module 216.

The input type parser 224 receives the search query 100 and analyzes the search query 100 to identify any known parameter types that may be referenced in the search query 100. In some implementations, the input type parser 224 outputs one or more intent parse objects in response to the query terms of the search query 100. In some implementations, the input type parser 224 utilizes a lookup table to identify any possible parameter types/values that may be present in the search query 100. The lookup table can define possible types of parameters for given values, whereby each value in the lookup table consists of one or more terms. For example, the lookup table can include entries for "sfo" and "lax." The term "sfo" may have the parameter type "airport code" associated therewith, while "lax" may have the parameter types "airport code" and "sport" (the short-hand representation of "lacrosse"). Further, in some implementations, each value/parameter type association in the lookup table may have a weight assigned thereto to indicate a likelihood that the entered query term(s) are values of the associated parameter type. For example, if a search term is "lax," the parameter type "airport code" may have a much higher weighting than "sport' or "adjective." In these implementations, the input parse objects may further include the weight associated to the value/parameter type combination.

The intent recognizer 226 receives the search query 100, and in some implementations, the identified input parse object. The intent recognizer 226 outputs a set of zero or more scored intent recognition objects 290. The intent recognizer 226 can generate and score the intent recognition objects in any suitable manner. In some implementations, the intent recognizer 226 identifies query intent records 252 from the query intent data store 250 by matching terms of the search query 100 to terms contained in the query intent data 255. For example, the intent recognizer 226 may attempt to match keywords contained in the query intent data 255 and/or can identify any potential category classification matches between the broad action and the terms in the search query 100. In this way, the intent recognizer 226 attempts to identify query intent records 252 without knowing the parameter type guesses that are defined in the input parse object. Additionally or alternatively, the intent recognizer 226 can identify query intent records 252 by matching parameter types identified in the input parse object to the set of parameters 256 defined in the respective intent records 252. In particular, the intent recognizer 226 can identify query intent records 252 based on the query terms of the search query 100 and the parameter type data defined in the input parse object. For instance, if the search query 100 contains the terms "sfo to jfk" and the input parse objects include parameter types of "airport code" and "airport code," the intent recognizer 226 may identify an intent record 252 that defines the broad action, "make a flight reservation."

For each identified query intent record 252, the intent recognizer 226 may generate one or more intent recognition objects 290 corresponding to the query intent record 252. Each of the intent recognition objects 290 includes an action (e.g., the broad action defined by the query intent record 252), and can further include a set of zero or more recognized argument objects. The intent recognizer 226 can identify the parameter types defined in the input parse object, and for each parameter type, one or more parameter values. If a particular parameter type has more than one potential value or if a value could potentially ascribe to more than one parameter type, the intent recognizer 226 can create a new intent recognition object for each possible interpretation. For example, if the search query 100 merely contains the term "sfo," the intent parse object may define the term "sfo" as the typed parameter value with the parameter type "airport" and the actual value of being "San Francisco International Airport." In this scenario, the intent recognizer 226 cannot be sure that whether the user wants to book travel to or from San Francisco International Airport. Thus, the intent recognizer 226 generates at least two intent recognition objects. The first intent recognition object 290 defines the action "book a flight" and the following recognized arguments: Departure_airport="San Francisco International Airport"; Arrival_airport=null. The second intent recognition object 290 has the action "book a flight" and the following recognized arguments: Departure_airport=null; Arrival_airport="San Francisco International Airport." As will be described below, the intent recognizer 226 can score both intent recognition objects 290, so as to identify the more relevant intent recognition object 290.

The intent scorer 228 can score intent recognition objects 290 in any suitable manner. In some examples, the intent scorer 228 generates an intent score using one or more features associated with the search query 100. For example, the intent scorer 228 can parse the search query 100 using regular expression (hereafter "regex") or grammar parsing techniques to determine whether substrings of the query are sufficiently related to the broad action defined by the intent record from which the intent recognition object 290 was created. For example, the intent scorer 228 can determine the number of characters in the longest regex- and/or grammar-matched substring of the search query 100. The intent scorer 228 can then divide that number by the total number of characters in the search query 100, thereby establishing a feature value that can be used as part of the intent score. Search queries 100 with lower feature values can receive correspondingly lower intent scores. Another feature that the intent scorer 228 can use to determine intent score are the number and quality of functional states associated with a particular action. For example, the intent scorer 228 can take a small constant N (e.g., 10) and average the scores of the N highest-scoring states that are associated with a particular intent recognition object 290. The average of these scores can be used as the intent recognition score for that intent recognition object. The intent scorer 228 may also incorporate user behavior statistics by logging information with respect to a particular intent recognition object 290. In this way, the intent scorer 228 can determine the similarity of the current search query 100 to other search queries 100 that resulted in a user selecting that particular intent recognition object 290 as opposed to other search results.

The intent scorer 228 ranks and filters the scored intent recognition objects 290. For each intent recognition object 290, the intent scorer 228 determines the query intent record 252 on which the intent recognition object 290 is based. The intent scorer 228 then determines whether the query intent record 252 includes a card layout file 258 or a layout file ID. If not (e.g., the layout file 258 or layout file ID field is set to "null" in the query intent record 252), then the intent recognition object 290 is discarded. In this way, the intent scorer 228 removes any intent recognition objects 290 that cannot have query cards 134 generated based thereon. Once the intent scorer 228 has discarded all the intent recognition objects 290 that cannot be used to generate a query card 134, the intent scorer 228 can rank the remaining intent recognition objects 290 based on their respective intent scores. The ranked set of intent recognition objects 290 is provided to the results processing module 216.

The results processing module 216 receives scored function IDs 244 and scored intent recognition objects 290 and generates search results 130 based thereon. The results processing module 216 can determine which function IDs 244 and/or scored intent recognition objects 290 to include in the search results 130 based on the respective scores thereof. In some implementations, the results processing module 216 normalizes the results scores of the function IDs 244 and/or the intent scores of the intent recognition objects 290 so that the results processing module 216 can objectively compare the results scores and intent scores. In some implementations, the results processing module 216 can boost the result scores and/or the intent scores using predetermined boosting factors. In other implementations, the results processing module 216 can normalize the result scores with respect to the greatest result score and the intent scores with respect to the highest intent score. In still other implementations, the results processing module 216 can function based on pre-determined rules that are executed regardless of the score associated with an intent recognition object 290 or a function ID 244. For example, the results processing module 216 may decide to always include at least one intent recognition object 290 in the search results, even if there are several highly scored function IDs 244 available to populate the search results. In another example, the results processing module 216 can impose a maximum number of intent recognition objects 290 to include in the search results 130, despite the fact that there may be several intent recognition objects 290 with scores that would otherwise warrant them a place in the search results 130. In yet another implementation, the results processing module 216 may include an intent recognition object 290 based on the function IDs 244 currently in the search results 130 and how many of those function IDs 244 would remain after a user were to select the query card 134 associated with the intent recognition object 290. For example, clicking on the query card 134 associated with a particular intent recognition object 290 would provide a new set of search results that are largely redundant in light of the function IDs 244 already available to the user, then the results processing module 216 may omit the intent recognition object 290 regardless of its score.

The results processing module 216 can then rank the function IDs 244 and the intent recognition objects 290 based on their respective scores. The ranked list of function IDs 244 and intent recognition objects 290 can define the order in which the cards 132, 134 (application cards 132 and query cards 134) appear in the displayed search results 130. In this way, the results processing module 216 interweaves application cards 132 and query cards 134. Furthermore, the results processing module 216 can determine the size and appearance of the cards 132, 134 based on the respective scores. For instance, an application card 132 that is based on a function ID 244 or a query card 134 that is based on an intent recognition object 290 that has a higher score can be sized bigger than an application card 132 that is based on a function ID 244 having a lower score. Additionally or alternatively, the results processing module 216 can determine which function IDs 244 and/or intent recognition objects 290 to base application cards 132 and/or query cards 134 on using the respective scores. For example, the results processing module 216 can discard any function IDs 244 or intent recognition objects 290 whose score does not exceed a threshold. In another example implementation, the results processing module 216 can limit the number of intent recognition objects 290 to base query cards 134 on to a predetermined number (e.g., no more than two query cards 134 to appear in the search results).

The results processing module 216 generates the result objects that contain the various cards 132, 134. For each function ID 244 that has a requisite result score, the results processing module 216 retrieves the function record 242 corresponding to the function ID 244, provided the function ID 244 was obtained from a function record 242 and was not generated in response to a selected search query 101. For each retrieved function record 242, the results processing module 216 can obtain a layout ID 248 from the retrieved function record 242 and can retrieve the layout record 272 corresponding to the layout ID 248 from the layout file data store 270. The retrieved layout record 272 contains a layout file. Alternatively, the retrieved function record 242 may store the actual layout file. Each layout file contains a template for generating a result object that contains an application card 132. The results processing module 216 can generate a result object corresponding to a function ID 244 using the retrieved layout record 272 and application state data 247 contained in the function record 242. The results processing module 216 further includes one or more access mechanisms in each result object. When the result object is rendered by the user device 300, the user device 300 generates a user selectable link 144 based on the access mechanisms. In some scenarios, the results processing module 216 retrieves the access mechanisms from the access mechanism data 246 of the function record 242 on which the result object is based. In other scenarios (e.g., a function ID 244 generated based on input parameters provided by a user), the results processing module 216 generates the access mechanisms based on rules and templates stored in the access mechanism data 246 of an application record 242. In these scenarios, the results processing module 216 may further encode the values of the input parameters in the result object, such that when rendered, the application cards 132 display the values of the input parameters to the user.

For each intent recognition object 290 that has a requisite intent score, the results processing module 216 retrieves the query intent record 252 indicated by the intent recognition object 290. For each retrieved query intent record 252, the results processing module 216 obtains the layout file 258 stored in the query intent record 252. The layout file 258 contains a result object that contains a query card 134. The layout file 258 may include a selected search query 101 and/or a query ID that identifies a selected search query 101, such that if a user selects the query card 134, the search engine 200 performs a new search using the selected search query 101.

The results processing module 216 interweaves the application cards 132 and the query cards 134 to obtain the search results 130. The results processing module 216 can transmit the search results 130 to the user device 300. The user device 300 displays the search results 130 in the SERP. In some scenarios, a user selects a query card 134 displayed in the search results 130. In response to the user selection, the user device 300 generates a selected search query 101 and provides the selected search query 101 to the search engine 200. In some implementations, the selected search query 101 includes query terms or a query ID. Additionally, in some implementations, the selected search query 101 includes input parameters. Each input parameter includes a value that is provided by the user via the query card 134.

The search module 212 receives the selected search query 101 and outputs new search results 130 based thereon. In some implementations, the query analysis module 218 analyzes the selected search query 101 to determine whether the selected search query 101 is the product of a selected query card 134. For example, if the selected search query 101 includes a query ID, the query analysis module 218 can determine that the selected search query 101 is the product of a selected query card 134. The query analysis module 218 can output the query ID and the inputted parameters (if any) to the set generation module 220.

In some implementations, the set generation module 220 generates a new consideration set based on the selected search query 101. The set generation module 220 can obtain the query intent record 252 that was used to generate the selected query card 134. As was previously discussed, the query intent data 255 of the query intent record 252 may indicate a list of function IDs 244 to which the query intent record 252 corresponds. In these implementations, the set generation module 220 can include the function IDs 244 stored in the query intent record 252 in the consideration set. In some implementations, the function IDs 244 may be unparameterized if the selected search query 101 corresponds to a function that accepts input parameters. Additionally, if the selected search query 101 includes input parameters, the set generation module 220 generates one or more function IDs 244 using the function syntaxes 257 defined in the query intent record 252. As was discussed, each function syntax 257 includes a specification for leveraging a function of an application that is relevant to the broad action defined by the query intent record 252, whereby the specification defines a manner by which to generate function ID 244 for the application given a set of parameter types. In this way, the set generation module 220 generates a function ID 244 for each application identified in the query intent record 252. The set generation module 220 can associate the generated (e.g., parameterized) function IDs 244 with their corresponding function records 242 and includes the function IDs 244 in the consideration set. The set generation module 220 outputs the consideration set (and any generated access mechanisms) to the scoring module 222. The scoring module 222 scores the function records 242 in the manner described above and outputs the scored consideration set to the results processing module 216. The results processing module 216 generates the new search results 130 based on the scored consideration set in the manner described above. In this scenario, however, the results processing module 216 does not generate any query cards 134. The results processing module 216 can output the new search results 130, which are transmitted to the user device 300.

The search engine 200 of FIGS. 2A-2F are provided for example. Variations of the search engine 200 are contemplated and are within the scope of the disclosure. Further, the search engine 200 may be included in a larger system.

Figure 3:
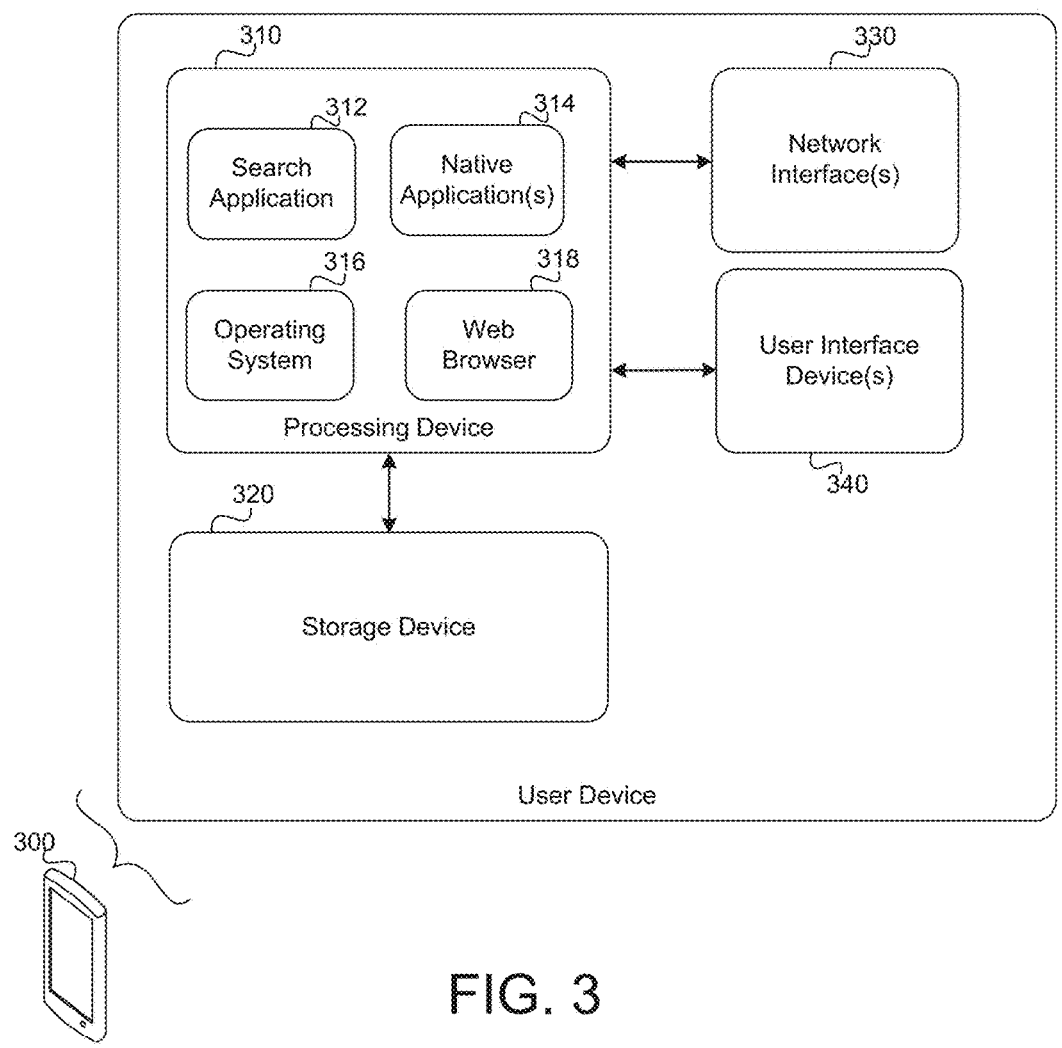
FIG. 3 is a schematic view of example components of a user device.

FIG. 3 illustrates an example of a user device 300. The example user device 300 includes a processing device 310, a storage device 320, a network interface 330, and a user interface 340. The processing device 310 includes memory (e.g., RAM and/or ROM) that stores computer readable instructions and one or more processors that execute the computer readable instructions. In implementations where the processing device 310 includes two or more processors, the processors can execute in a distributed or individual manner. The processing device 310 may execute a search application 312, an operating system 316, a web browser 318, and one or more native applications 314, all of which may be embodied as computer readable instructions. The storage device 320 includes one or more computer readable mediums (e.g., hard disk drive and/or flash memory). The storage device 320 can store the computer readable instructions that make up the search application 312, the web browser 318, and the one or more native applications 314. The storage device 320 stores any suitable type of data. For example, the storage device 320 may store data required by the user device 300 and/or provided by the user (e.g., downloaded and/or produced by the user). The network interface 330 includes one or more devices that are configured to communicate with the network. The network interface 330 can include one or more transceivers for performing wired or wireless communication. Examples of the network interface 330 can include, but are not limited to, a transceiver configured to perform communications using the IEEE 802.11 wireless standard, an Ethernet port, a wireless transmitter, and a universal serial bus (USB) port. The user interface 340 includes one or more devices that receive input from and/or provide output to a user. The user interface 340 can include, but is not limited to, a touchscreen, a display, a QWERTY keyboard, a numeric keypad, a touchpad, a microphone, and/or speakers. The user device 300 may include additional components not explicitly shown. The components may be interconnected by any suitable digital media, such as a bus.

The search application 312 displays a search bar 110 and receives search queries 100 via the search bar 110. In particular, a user can enter one or more query terms into the search bar. In some implementations, the search application 312 waits until the user executes the search (e.g., presses upon "search" button) to transmit a search query 100 to the search engine 200. In response to the search query 100, the search engine 200 responds with search results 130. The search application renders and displays the search results 130 in the SERP. The displayed search results 130 can include application cards 132 and/or query cards 134.

In other implementations, the search application 312 iteratively transmits the contents of the search query 100 as the user enters the query terms. In these implementations, the search application 312 can transmit a new search query 100 each time the user enters a character into the search bar and the search engine 200 can update the search results 130 as the user continues to enter the search query 100. In response to the updated search results 130, the search application 312 renders and displays the search results 130 in the SERP. The displayed search results 130 can include application cards 132 and/or query cards 134.

The application cards 132 allow a user to access a state of an application indicated by the application card 132. In some implementations, the displayed application card 132 in its entirety is a user selectable link 144. Additionally or alternatively, the displayed application card 132 can include an icon or textual string that is a user selectable link 144. In response to the user selection of the user selectable link 144, the search application 312 can transmit an instruction to the operating system 316 of the user device 300 to launch the application and to access the state. If the access mechanism is an application resource identifier, the search application 312 can instruct the operating system 316 to launch the native application 314 defined by the application resource identifier and to set the state of the application according to the contents of the application resource identifier. If the access mechanism is a web resource identifier, the search application 312 can transmit an instruction to the operating system 316 to launch the web browser 318 and to access the web application using the web resource identifier. If the access mechanism is a script, the search application 312 and/or the operating system 316 can execute the instructions defined in the script.

The query cards 134 allow a user to transmit a selected search query 101 to the search engine, and in some implementations, to provide additional input parameters in the selected search query 101. In implementations where the query cards 134 do not receive input parameters, the search application 312 displays the query card 134 within the displayed search results 130. The position of the query card 134 within the SERP may depend on the decisions made by the results processing module 216 of the search engine 200. For example, the ordering of the cards 132, 134 can be in accordance with the rankings determined by the results processing module 216. When the user selects a query card 134, the search application 312 transmits a selected search query 101 to the search engine 200. The selected search query 101 can include a set of query terms that are associated with the query card 134. For example, the set of query terms may be transmitted in the result object in which the selected query card 134 is encoded. Additionally or alternatively, the selected search query 101 can include a query ID that is associated with the query card 134. In response to the selected search query 101, the search engine 200 provides new search results 130, which the search application renders and displays.

In implementations where the query cards 134 receive input parameters, the search application 312 displays any received query cards 134 in the SERP. A displayed query card 134 can include one or more input elements displayed therein. Each input element is associated with a corresponding parameter type. For instance, a query card 134 for a taxi service may have an input element for a pickup location, an input element for a drop off location, and an input element for a pickup time. When a user populates any of the input elements and selects the query card 134, the search application 312 generates a selected search query 101 and assigns any inputted input parameters to the selected search query 101. For example, if the user enters a pickup location, "1234 Main" and a drop off location "4321 State" into the query card 134 and selects the query card 134, the search application 312 generates a selected search query 101 that includes a query ID corresponding to the selected card 134 (or includes query terms defining "call a taxi"), a pickup location parameter, and a drop off location parameter. In this example, the search application 312 assigns the input parameter "1234 Main" to a pickup location parameter of the selected search query 101 and "4321 State" to a drop off location parameter of the selected search query 101. The search application 312 can then transmit the selected search query 101 to the search engine 200.

The search engine 200 can respond to a selected search query 101 having input parameters with new search results 130 containing one or more application cards 132. The application cards 132 may indicate the values provided by the user as input parameters. For example, drawing from the "call a taxi" example, each application card 132 may correspond to a different taxi service and may each indicate the pickup and drop off locations. In this way, the user can select one of the application cards 132 to access the function and/or state defined by the application card 132. The user device 300 displays the new search results 130 in the SERP, whereby the user can select one or more of the application cards 132 displayed in the SERP. In response to the section of an application card 132, the search application 312 can access the state and/or functionality in the manner described above.

Figure 4:
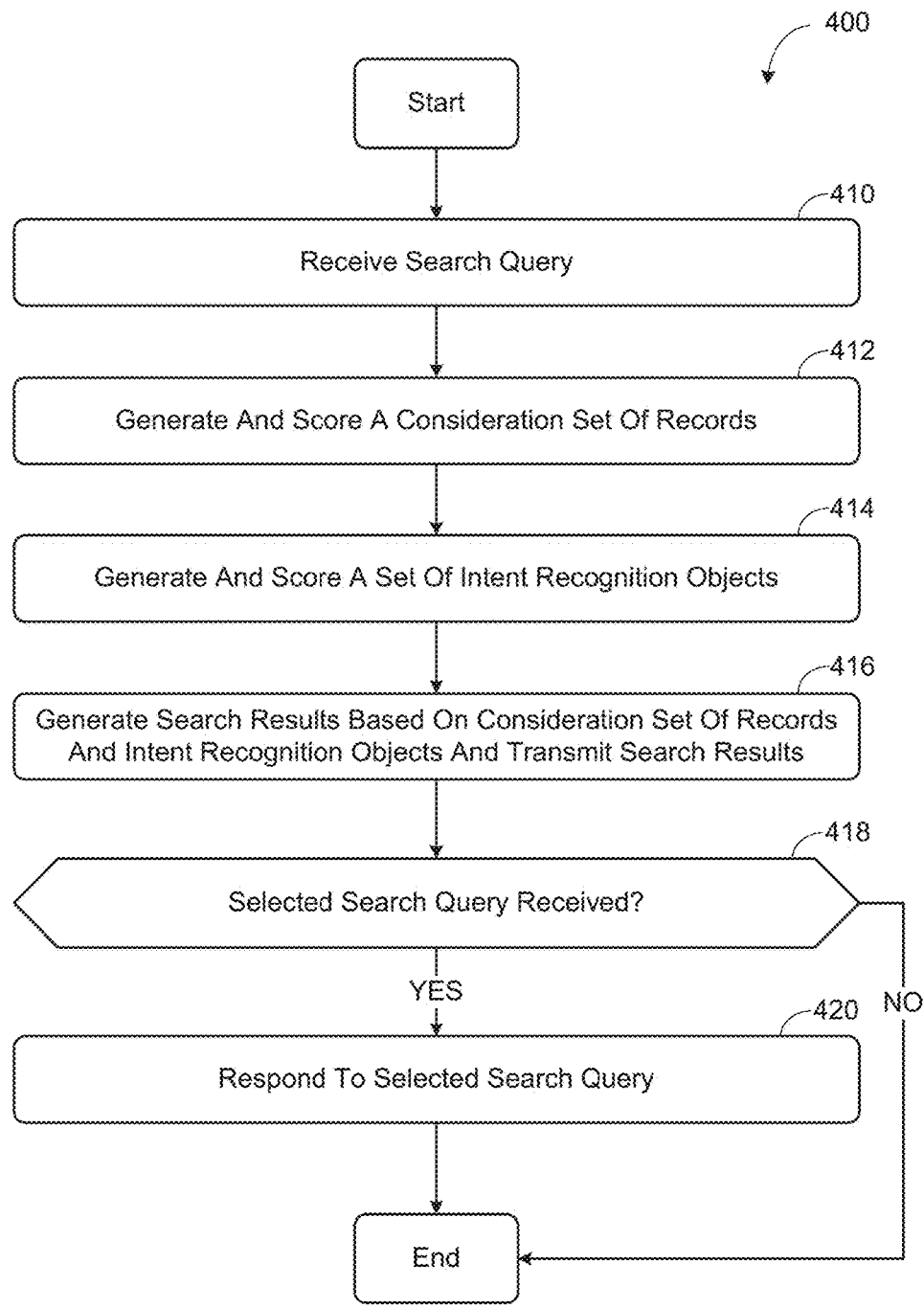
FIG. 4 is a flow chart of an example set of operations of a method for processing a search query.

Referring now to FIG. 4, an example method for generating search results 130 is described. The method 400 may be executed by the search engine 200.

At operation 410, the search engine 200 receives a search query 100 from a user device 300. The search query 100 may contain one or more query terms and zero or more context parameters. At operation 412, the search engine 200 generates and scores a consideration set of records, which is discussed with respect to FIG. 5. At operation 414, the search engine 200 generates and scores a set of intent recognition objects 290, which is discussed with respect to FIG. 6.

Figure 5:
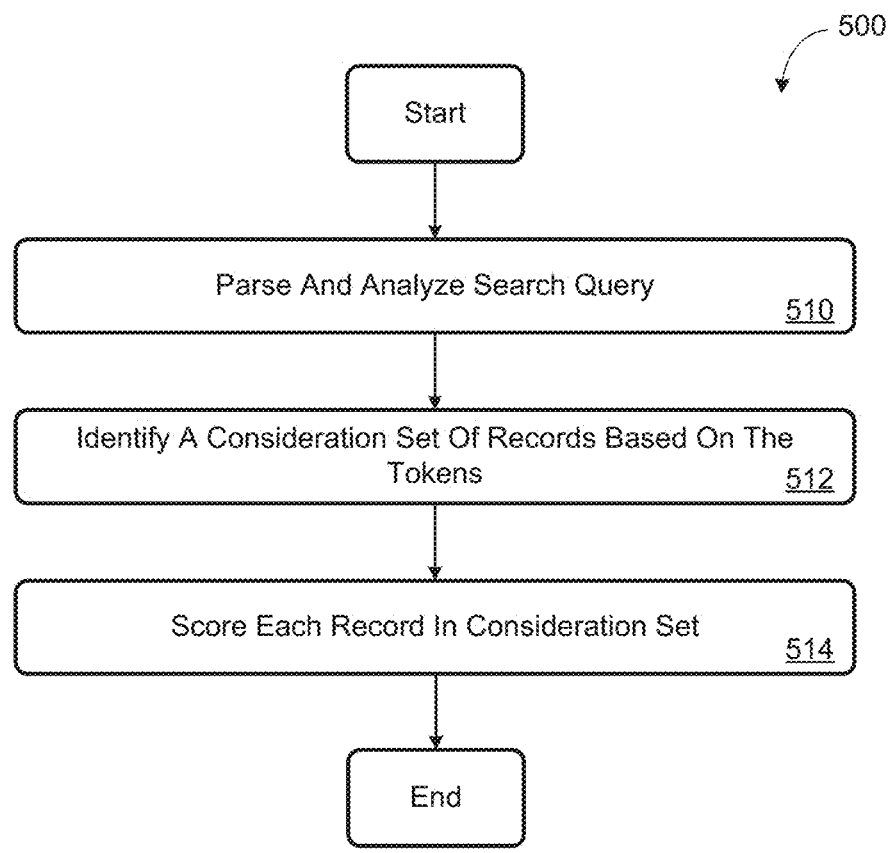
FIG. 5 is a flow chart of an example set of operations of a method for generating and scoring a consideration set of records.

FIG. 5 illustrates an example set of operations of a method 500 for generating and scoring a consideration set of records. For purposes of explanation, the method 500 is described with respect to the search module 212 of the search engine 200.

At operation 510, the query analysis module 218 parses and analyzes the search query 100 and outputs one or more tokens. As previously discussed, the search query 100 contains one or more query terms and zero or more context parameters. The query analysis module 218 can stem the search query 100, synonymize the search query 100, remove stop words from the search query 100, and/or tokenize the search query 100. The query analysis module 218 outputs one or more tokens representing the search query 100 to the set generation module 220.

At operation 512, the set generation module 220 identifies a consideration set of function records based on the one or more tokens. The set generation module 220 can search the function record data store 240 using the tokens. As previously discussed, in some implementations the set generation module 220 utilizes the Lucene Library to search and identify a consideration set of function records 242. The consideration set of function records includes function IDs 244 of function records 242 (or the function records 242 themselves) that at least matched a minimum number of tokens to the search query 100. In some implementations, each function 242 identified in the consideration set is also provided an initial score based on the degree to which the function record 242 matched to the tokens of the search query 100. The set generation module 220 outputs the consideration set to the scoring module 222.

At operation 514, the scoring module 222 scores each function ID 244 indicated by the consideration set and outputs the scored consideration set to the results processing module 216. The scoring module 222 receives the consideration set from the set generation module 220. For each function ID 244, the scoring module 222 can retrieve the corresponding function record 242 and calculate a result score of the function ID 244 based on the contents of the record 242. In some implementations, the scoring module 222 includes a machine-learned scoring model that scores a function ID 244 based on a number of scoring features, including features of the function record 242, features of the search query 100, and/or features of the function record 242 as it relates to the search query 100. In some of these implementations, the scoring module 222 can generate a feature vector that indicates function record scoring features, query scoring features, record-query scoring features, and function ID scoring features. If the consideration set does not include any function IDs 244 that were generated at query time, the function ID 244 scoring features may be set to null. The scoring module 222 can feed the feature vector to the machine learned scoring model, which outputs the result score of the function ID 244. The scoring module 222 outputs the scored consideration set of records to the results processing module 216.

Figure 6:
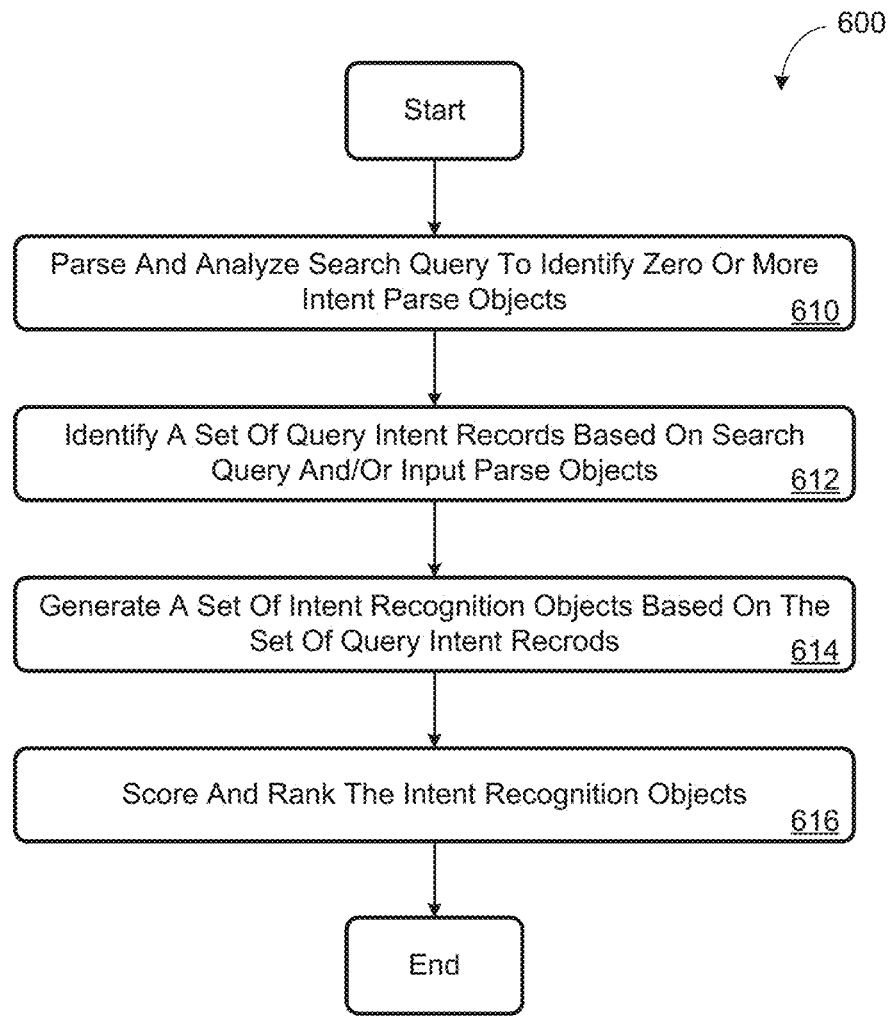
FIG. 6 is a flow chart of an example set of operations of a method for generating and scoring a set of intent recognition objects

FIG. 6 illustrates an example set of operations of a method 600 for generating and scoring a set of intent recognition objects 290. The method 600 is described with respect to the query intent module 214 of the search engine 200.

At operation 610, the input type parser 224 parses and analyzes the search query 100 to identify one or more input parse objects. An input parse object indicates a parameter type and a value corresponding to the parameter value. The parameter type is a possible type (e.g., category) of a given value. A given value is one or more terms that appear in the search query 100. The input type parser 224 analyzes the terms in the search query 100 to identify single terms and combinations of terms. For each term, and potentially, one or more combinations of terms, the input type parser 224 can identify possible parameter types implicated by the query term(s). In some implementations, the input type parser 224 can query a lookup table with the query term or combination of query terms to identify any potential parameter types of the query term or combination of terms. For each potential parameter type of a query term or combination of query terms, the input type parser 224 can generate an input parse object identifying the parameter type and a value indicating the query term or combination of the query terms. The input type parser 224 outputs the input parse objects to the intent recognizer 226.

At operation 612, the intent recognizer 226 identifies a set of query intent records 252 based on the search query 100 and/or the input parse objects. The intent recognizer 226 can search the query intent data store 250 using the terms of the search query 100 (which may be tokenized) and/or the parameter types indicated in the input parse objects. For example, the intent recognizer 226 can search the query intent data store 250 for query intent records 252 whose broad action or query intent data match to one or more of the query terms or the parameter types. The intent recognizer 226 can utilize the Lucene libraries to identify relevant query intent records 252.

At operation 614, the intent recognizer 226 generates a set of intent recognition objects based on the set of query intent records 252. For each identified query intent record 252, the intent recognizer 226 may generate one or more intent recognition objects 290 corresponding to the query intent record 252. Each of the intent recognition objects 290 includes an action (e.g., the broad action defined by the query intent record 252), and can further include a set of zero or more recognized argument objects. A recognized argument object is a parameter type with a value assigned thereto. The intent recognizer 226 can utilize the set of parameters 256 in the query intent record and the parameter type/value combinations defined in the input objects to identify the argument objects. When a particular parameter type has more than one potential value or if a value could potentially correspond to more than one parameter type, then the intent recognizer 226 creates a new intent recognition object for each possible interpretation of the search query 100. The intent recognizer 226 outputs the set of intent recognition objects 290 to the intent scorer 228.

At operation 616, the intent scorer 228 scores the intent recognition objects 290 and outputs the scored intent recognition objects 290 to the results processing module 216. In some implementations, the intent scorer 228 removes any intent recognition objects 290 from the set if the query intent record 252 corresponding to the intent recognition object 290 does not include a layout file 258. Put another way, if the intent recognition object 290 cannot be used to generate a query card 134, then the intent scorer 228 does not score the intent recognition object 290 and the intent recognition object 290 will not factor into the search results 130. The intent scorer 228 can generate scores for intent recognition objects 290 using a variety of different techniques. For example, the intent scorer can use grammar and/or regex parsing techniques on the search query 100 associated with the intent recognition object 290 to determine whether substrings of the search query 100 indicate the action defined by the intent recognition object 290. In another example, the intent scorer 228 can make calculations based on the functional states associated with the intent record from which the intent recognition object 290 was created. In yet another example, the intent scorer 228 can use user behavior statistics to determine which intent recognition objects 290 have been clicked on by users in the past and how the similar the queries in the past are to the query currently being analyzed. After scoring the intent recognition objects 290, the intent scorer 228 outputs the scored intent recognition objects to the results processing module 216.

Referring back to FIG. 4, at operation 416, the results processing module 216 generates the search results 130 and transmits the search results 130 to the user device 300 that transmitted the search query 100. The results processing module 216 receives the scored consideration set of records 252 (e.g. FIG. 5) and the scored set of intent recognition objects 290 (e.g., FIG. 6) and generates the search results 130 based thereon. In some implementations, the results processing module 216 normalizes the respective scores of the scored records 252 and the scored recognition objects 290. For instance, the results processing module 216 can boost the scores of the function records 242 and/or the scored recognition objects 290. The results processing module 216 can rank the function records 242 and the intent recognition objects 290 based on the normalized scores. The results processing module 216 determines the order in which the search results (i.e., application cards 132 and/or query cards 134) appear in the SERP, and which application cards 132 and/or query cards 134 to include in the search results 130 based on the rankings thereof. The results processing module 216 can also determine the size of each application card 132 and/or query card 134 based on the rankings. The results processing module 216 generates the search results by retrieving a layout record 272 for each function record 242 that is to be represented in the search results 130 and a card layout file 258 for each query intent object that is to be represented in the search results 130. The results processing module 216 populates fields within the layout file of the layout record 272 and card layout files 258 based on the contents of the respective function records 242 and intent recognition objects. The results processing module 216 includes one or more access mechanisms in one or more of the fields of the layout file. Each populated layout file of the layout record 272 and card layout file 258 may be respectively included in the search results as a result object. The results processing module 216 (or a downstream module) transmits the search results 130 to the user device 300.

At operation 418, the search engine 200 waits for a response from a selected search query 101 from the user device 300. If and when the search engine 200 receives a selected search query 101 response at operation 420, the search module 212 processes the selected search query 101 (discussed with respect to FIG. 7).

Figure 7:
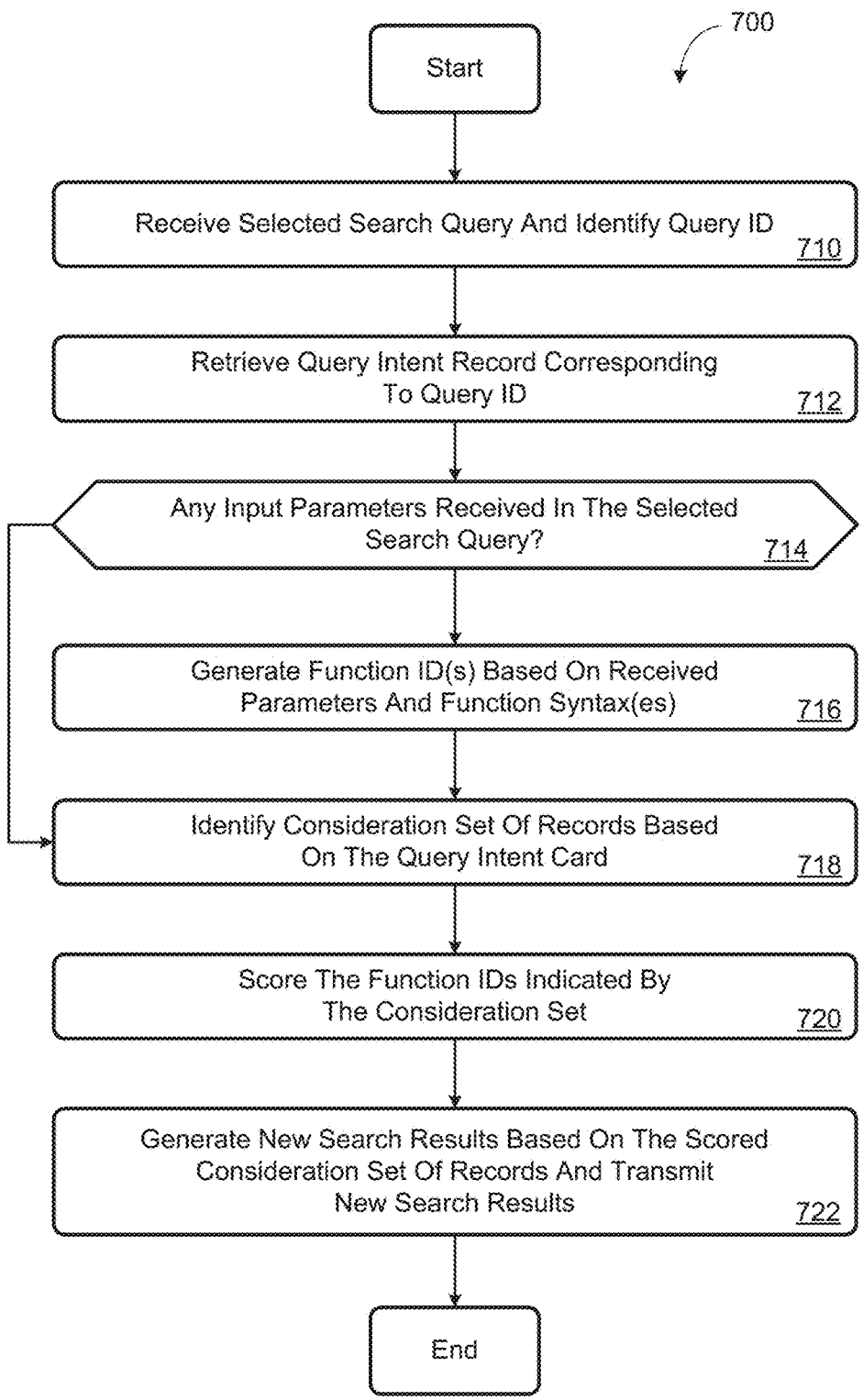
FIG. 7 is a flow chart of an example set of operations of a method for processing a selected search query.

FIG. 7 illustrates an example set of operations of a method 700 for processing a selected search query 101. At operation 710, the query analysis module 218 receives the selected search query 101 from a user device 300 and identifies the query ID from the selected search query 101. The user device 300 receives the selected search query 101 in response to a user selection of a corresponding query card 134. The query ID indicates the query intent record 252 that was used to generate the selected query card 134.

At operation 712, the set generation module 220 retrieves a query intent record 252 corresponding to the query ID. In some implementations, the query ID is the intent ID 254 of the query intent record 252. In other implementations, the query ID is stored in the query intent data 255.

At operation 714, the set generation module 220 determines whether there were any input parameters received in the selected search query 101. If so, the set generation module 220 can generate one or more function IDs 244 based on the received input parameters and the retrieved query intent record 252 at operation 716. In some implementations, the set generation module 220 utilizes the function syntaxes 257 defined in the query intent record 252 to generate the function IDs 244. As previously mentioned, the query intent record 252 corresponding to the selected search query 101 indicates function IDs 244 corresponding to software applications that perform the broad action defined by the selected query card 134. For each of these software applications, the set generation module 220 retrieves a function syntax 257 corresponding to the software application and generates a function ID 244 based on the input parameters and the function syntax 257. In these implementations, the function syntaxes 257 define the manner by which function ID 244 can be generated for a particular software application. For example, a function syntax 257 of a particular application can define how to encode certain types of parameters in a function ID 244. The set generation module 220 can add the generated function IDs 244 to the consideration set.

At operation 718, the set generation module 220 identifies a consideration set of function records 242 based on the retrieved query intent record 252. In some implementations, the query intent record 252 defines a set of function records 242 that correspond to the broad action defined by the query intent record 252. Put another way, the set of function records 242 identified in the query intent data 255 of the query intent record 252 define states of applications that are likely to perform the function defined by the broad action. The set generation module 220 uses the function records 242 identified in the query intent record 252 as the consideration set of records 252. Additionally or alternatively, the set generation module 220 can search the function record data store 240 using query terms corresponding to the selected search query 101. The set generation module 220 can add the function IDs 244 of any identified function records 242 to the consideration set.

At operation 720, the scoring module 222 scores the consideration set of records 242. The scoring module 222 can score each function record 242 based on the features defined in the function record 242, features of the generated function IDs 244, features of the selected search query 101 (e.g., the broad action, any additional input parameters, and/or the query intent data), and features of the function record 242. As previously discussed, the scoring module 222 may include a machine-learned model that receives the scoring features and outputs a result score of the function record 242. In some implementations, the scoring module 222 generates a feature vector for each function ID 244 in the consideration set that indicates function record scoring features, query scoring features, record-query scoring features, and function ID scoring features. If a function IDs 244 was generated at query time, the function ID scoring features may be set to null in the feature vector of the function ID 244. Similarly, if a function ID 244 was obtained from an identified function record 242 or from a query intent card 134, the function record scoring features may be set to null in the feature vector of the function ID 244. For each function ID 244 in the consideration set, the scoring module 222 can feed the feature vector to the machine learned scoring model, which outputs the result score of the function ID 244. The scoring module 222 outputs the scored function IDs 244 to the results processing module 216. The scoring module 222 can output the scored consideration set of records 252 to the results processing module 216. As previously mentioned, the scored consideration set of records 252 may include the actual function records 242 or the function IDs 244 thereof.

At operation 722, the results processing module 216 generates the new search results 130 based on the scored function IDs and transmits the new search results 130 to the user device 300. The results processing module 216 can rank the function records 242 according to the respective results scores thereof. The results processing module 216 determines the function IDs 244 on which it bases the search results 130 on the respective result scores of the function IDs 244. For each function ID 244, the results processing module 216 retrieves a layout record 272 based on the layout ID 248 defined in the function record 242 corresponding to the function ID 244. In the case of generated function IDs 244, the generated function IDs 244 have corresponding function records 242 that pertain to the state where a user can leverage a particular function. For example, in the case of a flight reservation software application, the state of the application where a user ordinarily enters the flight information (e.g., departure airport, arrival airport, departure date, and arrival date) may have a corresponding function record 242. In the event a function ID 244 is generated that leverages the flight reservation function, the results processing module 216 utilizes the function record 242 corresponding to the flight reservation function to generate retrieve the layout file on which the search result is based. For each function record 242 to be used to generate the search results 130, the results processing module 216 generates a result object containing an application card 132 corresponding to a function record 242 using the layout record 272 indicated by the function record 242 and the data contained in the function record 242 (e.g., the application state information 247 and the access mechanism data 246). In the case of a generated function ID 244, the results processing module 216 generates one or more access mechanisms based on the generated function ID 244 and the access mechanism data 246 contained in the function record 242 relating to the generated function ID 244. In the case of function IDs 244 that were obtained from identified function records 242, the results processing module 216 obtains one or more access mechanisms from the access mechanism data 246 contained in the function record 242. For each function ID 244, the results processing module 216 includes the access mechanisms in the result object corresponding to the function ID 244. Furthermore, if the selected search query 101 included additional input parameters, the results processing module 216 can embed one or more of the values provided as input parameters in the result object, such that the application card 132, when rendered, reflects the values input by the user. The results processing module 216 (or a downstream module) can transmit the new search results 130 to the user device 300.

Figure 8:
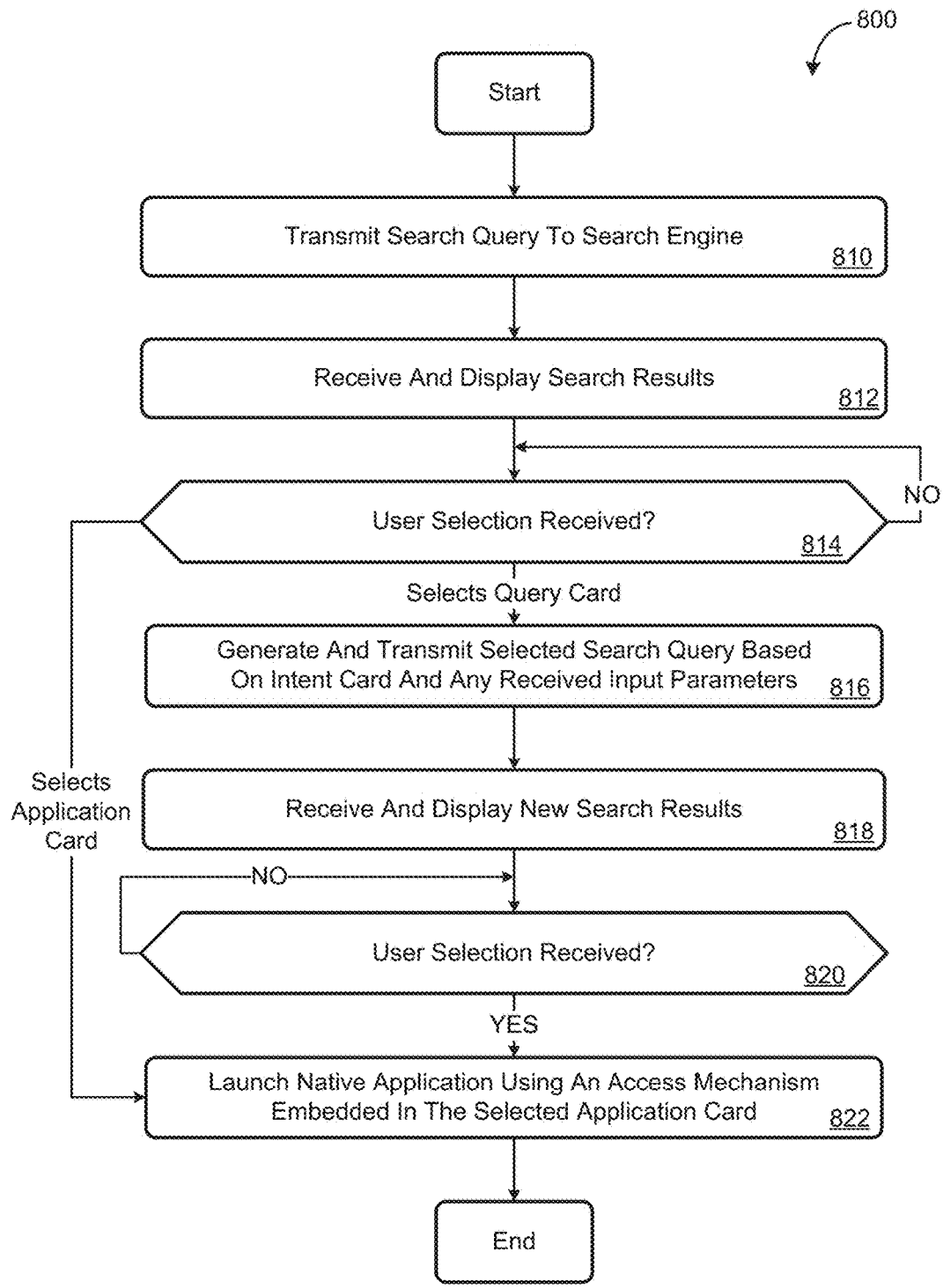
FIG. 8 is a flow chart of an example set of operations of a method for executing a search on a user device.

FIG. 8 illustrates an example set of operations of a method 800 for performing a search on a user device 300. For purposes of explanation, the method 800 is described with respect to the search application.

At operation 810, the search application 312 transmits a search query 100 to the search engine 200. A user can enter the search query 100 into a search bar displayed in a GUI by the search application 312. The search application 312 can determine any additional context parameters to include in the search query 100 (e.g., geolocation, operating system type, username, etc.). The search application 312 can transmit the search query 100 when the user instructs the search application 312 to transmit the search query 100 (e.g., by pressing a "search" button) or each time the user enters a new character in the search bar.

At operation 812, the search application 312 receives the search results 130 and displays the search results 130. The search application 312 can render the search results 130 into a displayable format and can output the displayable search results 130 to the user interface 340 of the user device 300. At operation 814, the search application 312 waits for a user selection.

In the event the user has selected a query card 134, the search application 312 generates a selected search query 101 and transmits the selected search query 101 to the search engine 200 at operation 816. In some implementations, the query card 134 includes a query ID embedded therein. In these embodiments, the search application 312 includes the query ID in the selected search query 101. Additionally or alternatively, the query card 134 has a set of predetermined query terms embedded therein (e.g., a natural language search query). In these implementations, the search application 312 includes the predetermined query terms in the selected search query 101. If the selected query card 134 is configured to receive input parameters and the user has entered values into one or more of the input elements 142 in the query card 134, the search application 312 reads in the entered values as input parameters and includes the input parameters into the selected search query 101. In some implementations, the search application 312 includes context parameters in the selected search query 101 as well. Upon the user's selection of the query card 134, the search application transmits the selected search query 101 to the search engine 200.

At operation 818, the search application receives and displays the new search results 130. In response to transmitting the selected search query 101, the search application receives new search results 130 from the search engine 200. In some implementations, the new search results only contain application cards 132. The search application renders and displays the new search results in the SERP via the user interface 340. At operation 820, the search application 312 waits for a user selection of an application card 132.

When a user selects an application card 132 (either at operation 814 or operation 820), the search application 312 accesses a state or function of an application defined by the selected application card 132, as shown at operation 822. The user can select an application card 132 by pressing on a user selectable link 144 displayed in the application card 132 or, in some implementations, by selecting (e.g., pressing) on the application card 132 itself. In the latter scenario, the application card 132 itself is a user selectable link 144. In response to the user selection of the application card 132, the search application 312 can transmit an instruction to the operating system 316 of the user device 300 to launch the application and to access the state. If the access mechanism is an application resource identifier, the search application 312 can instruct the operating system 316 to launch the native application defined by the application resource identifier and to set the state of the application according to the contents of the application resource identifier. If the access mechanism is a web resource identifier, the search application 312 can transmit an instruction to the operating system 316 to launch the web browser 314 and to access the web application using the web resource identifier. If the access mechanism is a script, the search application 312 and/or the operating system 316 can execute the instructions defined in the script. In some scenarios, the application is not installed on the user device 300. In such a scenario, selection of the application card causes the search application 312 to launch an application that accesses a digital distribution platform and to set the state of the application to a state where the user can select the digital distribution platform. If/when the user downloads the native application to the user device 300, the search application instructs the operating system 316 to launch the newly downloaded application and set the state of the newly downloaded application to a state referenced by the access mechanism.

Figure 9:
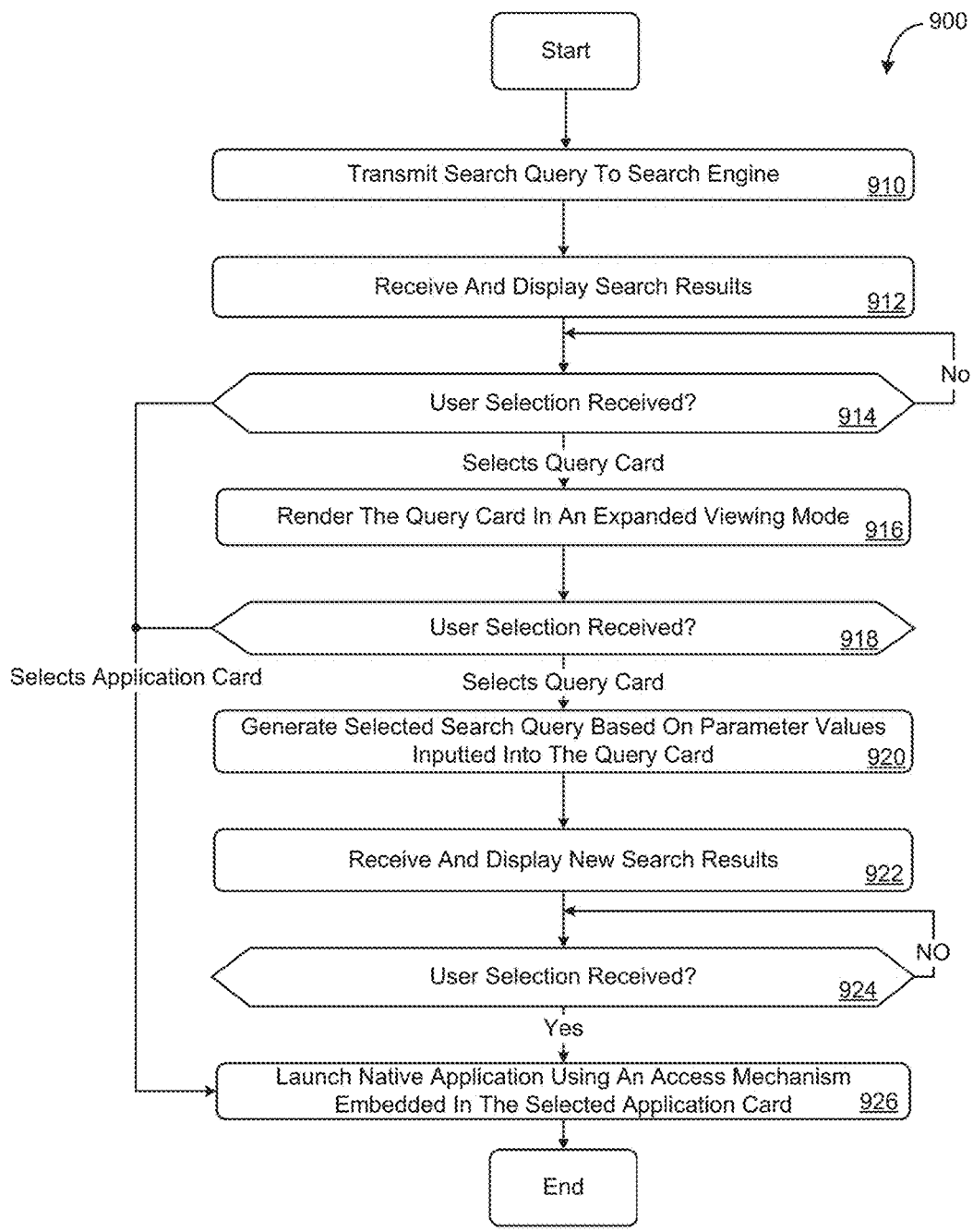
FIG. 9 is a flow chart of an example set of operations of a method for displaying search results in a search engine results page.

FIG. 9 illustrates an example method 900 for displaying search results 130 in a SERP. For purposes of explanation, the method 900 is described with respect to the search application.

At operation 910, the search application 312 transmits a search query 100 to the search engine 200. A user can enter the search query 100 into a search bar displayed in a GUI by the search application 312. The search application 312 can determine any additional context parameters to include in the search query 100 (e.g., geolocation, operating system type, username, etc.). The search application 312 can transmit the search query 100 when the user instructs the search application 312 to transmit the search query 100 (e.g., by pressing a "search" button) or each time the user enters a new character in the search bar.

At operation 912, the search application 312 receives the search results 130 and displays the search results 130. In some scenarios, the search results 130 include one or more query cards 134 that receive input parameters. In such a scenario, the search application 312 initially displays these query cards 134 in a collapsed viewing mode. In some implementations, the result object that contains the query card 134 includes data defining the layout of the collapsed viewing mode and data defining the layout of the expanded viewing mode. Initially, the search application 312 renders the query card 134 in the collapsed viewing mode using the data defining the layout thereof. At operation 914, the search application 312 waits for a user selection.

In the event the user has selected the query card 134 (or a resize element on the query card 134), the search application 312 renders the query card 134 in the expanded viewing mode, as shown at operation 916. The search application 312 can utilize the data defining the expanded viewing mode to render the query card 134. In this way, the query card 134 includes one or more input elements that can receive user input. By waiting until the user has selected the query card 134 to show the query card 134 in an expanded viewing mode, real estate in the SERP is preserved until the user indicates at least some intention of using the query card 134. At operation 918, the search application 312 waits for a user selection.

In the event the user enters one or more input parameters into the query card 134 and selects the query card 134, the search application 312 generates a selected search query 101 based on the input parameters and transmits the selected search query 101 to the search engine 200, as shown at operation 920. In some implementations, the query card 134 includes a query ID embedded therein. In these embodiments, the search application 312 includes the query ID in the selected search query 101. Further, the search application 312 reads in the entered input parameters and includes the input parameters into structured fields of the selected search query 101 (e.g., "depart_airport=SFO"; "arrive_airport=DTW"). Additionally or alternatively, the query card 134 has a set of predetermined query terms embedded therein (e.g., a natural language search query). In these implementations, the search application 312 includes the predetermined query terms and the input parameters in the selected search query 101. In some implementations, the search application 312 utilizes a template transmitted with the query card 134 to generate a natural language selected search query 101. Upon the user's selection of the query card 134, the search application transmits the selected search query 101 to the search engine 200.

At operation 922, the search application 312 receives and displays the new search results 130. In response to transmitting the selected search query 101, the search application 312 receives new search results 130 from the search engine 200. In some implementations, the new search results 130 only contain application cards 132. The search application 312 renders and displays the new search results in the SERP via the user interface 340. At operation 924, the search application 312 waits for a user selection of an application card 132.

When a user selects an application card 132 (at operations 914, 918, or 924), the search application 312 accesses a state or function of an application defined by the selected application card 132, as shown at operation 926. The user can select an application card 132 by pressing on a user selectable link 144 displayed in the application card 132 or, in some implementations, by selecting (e.g., pressing) on the application card 132 itself. In response to the user selection of the application card 132, the search application 312 transmits an instruction to the operating system 316 of the user device 300 to launch the application and to access the state, as was described above.

Figure 10:
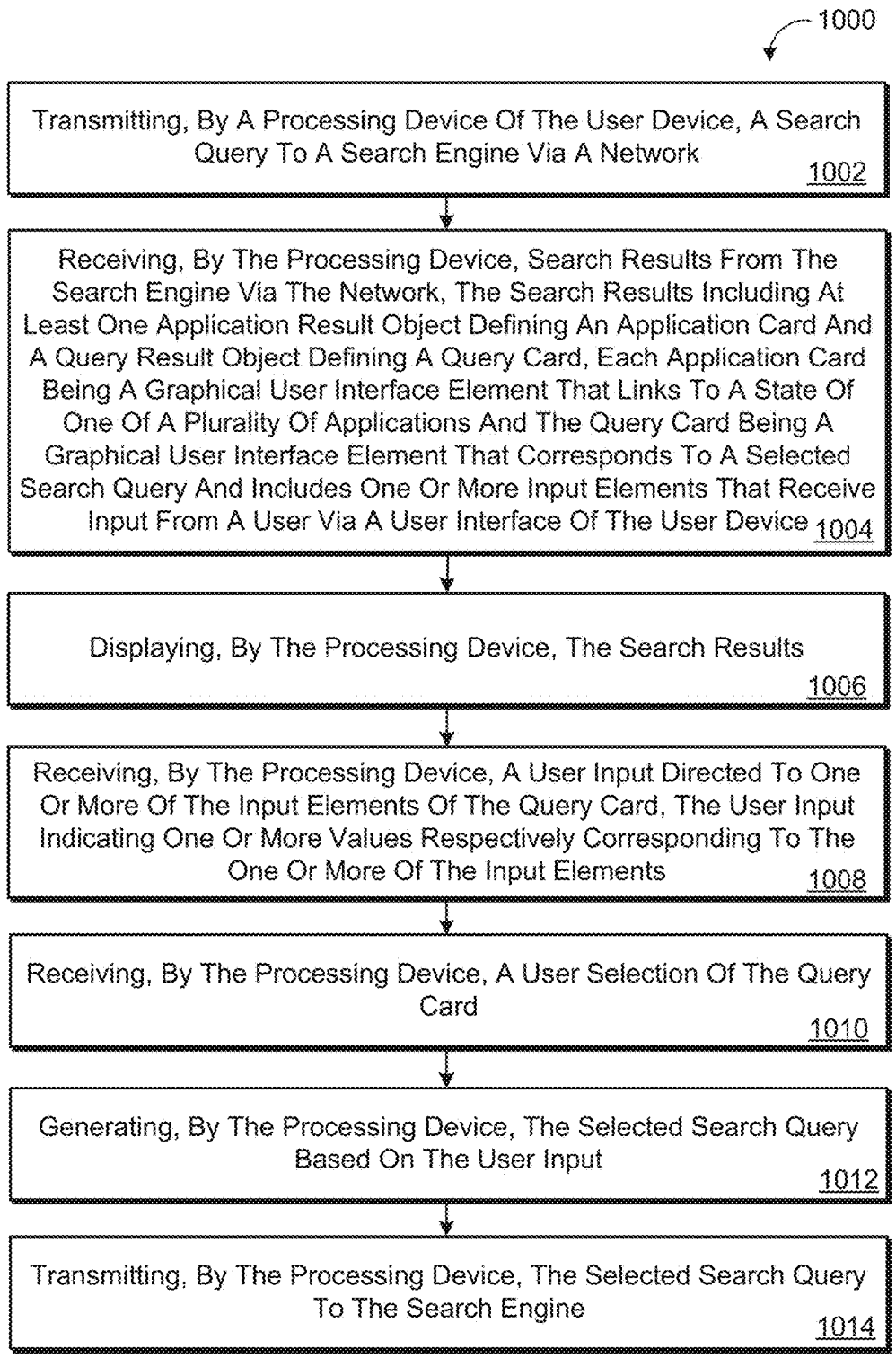
FIG. 10 is a flow chart of an example set of operations of a method for executing a search on a user device.

FIG. 10 provides an example arrangement of operations for a method 1000 of executing a search on a user device 300. The method 1000 includes, at block 1002, transmitting (by a processing device 310 of the user device 300) a search query 100 to a search engine 200 via a network 150. At block 1004, the method 1000 includes receiving, also by the processing device, search results from the search engine via the network 150. The search results 130 include at least one application result object that defines an application card 132, 132a-132j and a query result object that defines a query card 134. Each application card 132, 132a-132j is a graphical user interface element that links to a state of one of a plurality of applications 314 and the query card 134 is a graphical user interface element that corresponds to a selected search query 101 and includes one or more input elements 142 that receive input from a user via a user interface 340 of the user device 300. At block 1006, the method 1000 also includes displaying, by the processing device 310, the search results 130. At block 1006, the method 1000 includes receiving, by the processing device 310, a user input directed to one or more of the input elements 142 of the query card 134. The user input indicates one or more values respectively corresponding to the one or more of the input elements 142. The method 1000 also includes, at block 1010, receiving, by the processing device 310, a user selection of the query card 134, and at block 1012, generating, by the processing device 310, the selected search query 101 based on the user input. Finally, at block 1014, the method 1000 includes transmitting, from the processing device 310, the selected search query 101 to the search engine 200.

In some implementations, generating the selected search query 101 includes generating the selected search query 101 using a query identifier 254 corresponding to the selected query card 134. The selected search query 101 is a structured search query 100 that has one or more parameter fields that respectively receive predetermined parameter types. In addition, generating the selected search query includes determining the values inputted into one or more of the input elements 142 of the query card 134, and assigning the inputted values to the corresponding parameter fields of the structured search query 100.

In some examples, generating the selected search query 101 includes generating the selected search query 101 using a template that identifies a set of predetermined query terms corresponding to the selected query card 134 and one or more parameter fields that receive predetermined parameter types. The selected search query 101 is a natural language search query. In this example, generating the selected search query 101 further includes determining the values inputted into one or more of the input elements 142 of the query card 134, and assigning the inputted values to the corresponding parameter fields of the selected search query 101.

In some implementations, the method 1000 further includes receiving, by the processing device 310, new search results 130 in response to the selected search query 101. The new search results 130 include one or more new application cards 132, 132a-132j. Each of the new application cards 132, 132a-132j includes one or more access mechanisms that are based on input parameters of the input provided in the input elements 142. The method 1000 also includes displaying, by the processing device 310, the new search results 130. When displayed, the one or more new application cards 132, 132a-132j, display the values in each of the one or more new application cards 132, 132a-132j. The method 1000 may also include receiving, by the processing device 310, a user selection of one of the new application cards 132, 132a-132j; launching, by the processing device 310, a native application 314 indicated by the access mechanism; and setting, by the processing device 310, the native application 314 to a state indicated by the access mechanism, e.g., a script or an application resource identifier. In some examples, launching the native application 314 includes downloading (by the processing device 310), the native application 314 from a digital distribution platform. In some examples, for each new application card, the one or more access mechanisms are generated based on the values provided as user input.

Figure 11:
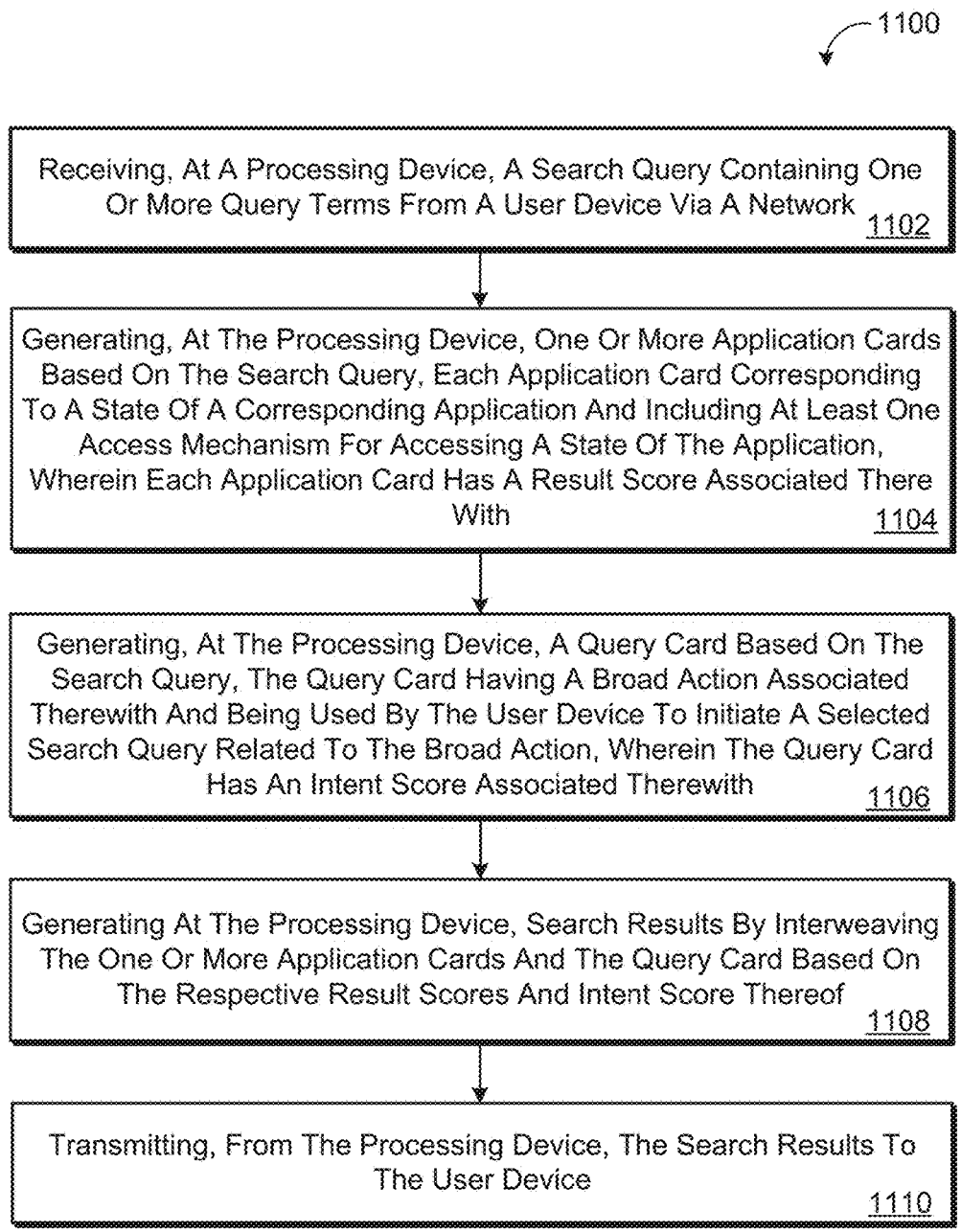
FIG. 11 is a flow chart of an example set of operations of a method for executing a search on a search engine.

FIG. 11 provides an example arrangement of operations for a method 1100 of executing a search on a search engine 200. The method 1100 includes, at block 1102, receiving, at a processing device 210, a search query 100 containing one or more query terms from a user device 300 via a network 150. At block 1104, the method 1100 includes generating, at the processing device 210, one or more application cards 132, 132a-132j based on the search query 100. Each application card 132, 132a-132j corresponds to a state of a corresponding application and includes at least one access mechanism for accessing a state of the application. Each application card 132, 132a-132j has a result score associated therewith. The method 1100 also includes, at block 1106, generating (at the processing device 210) a query card 134 based on the search query 100. The query card 134 has a broad action associated therewith and is used by the user device 300 to initiate a selected search query 101 related to the broad action. The query card 134 has an intent score associated therewith. The method 1100 also includes, at block 1108, generating (at the processing device 210) search results 130 by interweaving the one or more application cards 132, 132a-132j and the query card 134 based on the respective result scores and intent score thereof. At block 1110, the method 1100 includes transmitting from the processing device 210 the search results 130 to the user device 300.

In some implementations, generating the query card 134 includes identifying a query intent record 252 based on the search query 100 that defines the broad action and query intent data that defines features relating to the broad action. Generating the query card may also include generating an intent recognition object 290 based on the identified query intent record 252. The intent recognition object 290 indicates the broad action defined in the query intent record 252 from which the intent recognition object 290 was generated. Generating the query card may also include determining whether the query intent record 252 from which the intent recognition object 290 was generated has a corresponding intent card layout file, and when the query intent record 252 has a corresponding intent card layout file, the method 1100 includes generating the query card 134 based on the intent card layout file. Generating the query card 134 may include determining the intent score of the query card 134 based on the query intent record 252 and the search query 100. Additionally or alternatively, in some examples, the query card 134 is generated based on a query intent record 252 defining the broad action and features of the broad action, and the selected search query 101 defined by query card 134 corresponds to the broad action. In some examples, the method 1100 also includes receiving (at the processing device 210), the selected search query 101 from the user device 300 in response to a user selection of a query card 134 at the user device 300, and retrieving (also at the processing device 210), the query intent record 252 used to generate the selected query card. The method 1100 may also include identifying, (at the processing device 210), one or more function records 242 from the query intent records 252. Each function record 242 a state of a respective application that corresponds to the broad action defined in the query intent record 255. The method 1100 also includes generating (at the processing device 210), one or more new application cards 132, 132a-132j based on the one or more function records 242, and transmitting (also at the processing device 210), the search results 130 to the user device 300.

The query card 134 one or more input elements 142 that when rendered at the user device 300 receive input parameters that are included in the selected search query 101 when the query card 134 is selected. Additionally, the query intent record 252 used to generate the query card 134 may include one or more function syntaxes 257 and a set of one or more input parameters that the query card 134 receives. Each function syntax 257 includes a specification to generate a function identifier 244 based on received input parameters. The function identifier 244 is used to generate one or more access mechanisms 246 that the user device 300 utilizes to access a state of an application given a set of parameter values. The method 1100 may also include receiving (at the processing device 210), the selected search query 101 from the user device 300 in response to a user selection of a query card 134 at the user device 300. The selected search query 101 is indicative of a set of one or more query terms and includes values of one or more of the input parameters. The method 1100 may also include retrieving (at the processing device 210), the query intent record 252 used to generate the selected query card 134. For each function syntax 257 defined in the query intent record 252, the method 1100 may include generating (at the processing device 210) a new function identifier 244 based on the function syntax 257 and the values of the input parameters, and associating, at the processing device 210, the function identifier 244 to a function record 242 indicating a state of an application that corresponds to the generated function identifier 244 and defining features of the state. The method 1100 also includes determining (at the processing device 210) a results score for each of the function identifier 244 based on features of the function records 242 and the selected search query 101, and selecting (at the processing device 210) one or more of the scored function records 242 based on the respective result scores of the scored function records 242. The method 1100 also includes generating (at the processing device 210) one or more new application cards 132, 132a-132j based on the selected function records 242 and the values of the one or more input parameters to obtain new search results 130. Each application card 132, 132a-132j includes one or more access mechanisms, where at least one of the access mechanisms is generated based on a respective generated function identifier 244. The method 1100 includes transmitting the search results 130 to the user device 300. The new application cards 132, 132a-132j indicate the values of the received input parameters, whereby when the new application cards 132, 132a-132j are rendered at the user device 300 the new application cards 132, 132a-132j display the input parameters in each of the new application cards 132, 132a-132j.

In some implementations, the search results 130 include a plurality of query cards 134. The plurality of query cards 134 are interweaved with the one or more application cards 132, 132a-132j. In some examples, generating the query card 134 includes parsing the query terms of the search query 100 to identify one or more intent parse objects 290. Each intent parse object defines a potential parameter type of one or more of the query terms and a value corresponding to the potential parameter type. Generating the query card also includes identifying a query intent record 252 based on the potential parameter type. The query intent record 252 defines a broad action corresponding to the selected search query 101. In addition, generating the query card includes generating an intent recognition object 290 based on the query intent record 252. The intent recognition object 290 indicates the broad action defined in the query intent record 252 and one or more parameter types that are relevant to the broad action. Generating the query card also includes generating the query card 134 based on the intent recognition object 290. When the query card 134 is rendered by the user device 300, the query card 134 includes one or more input parameters that respectively receive user input that is included in the selected search query 101 upon selection of the query card 134.

The methods 400, 500, 600, 700, 800, 900, 1000, and 1100 described above are provided for example only and not intended to limit the scope of the disclosure. The ordering of the operations is not mandatory and some operations may be performed in parallel. Further alternate or additional operations not explicitly described may be performed as well.

Figure 12:
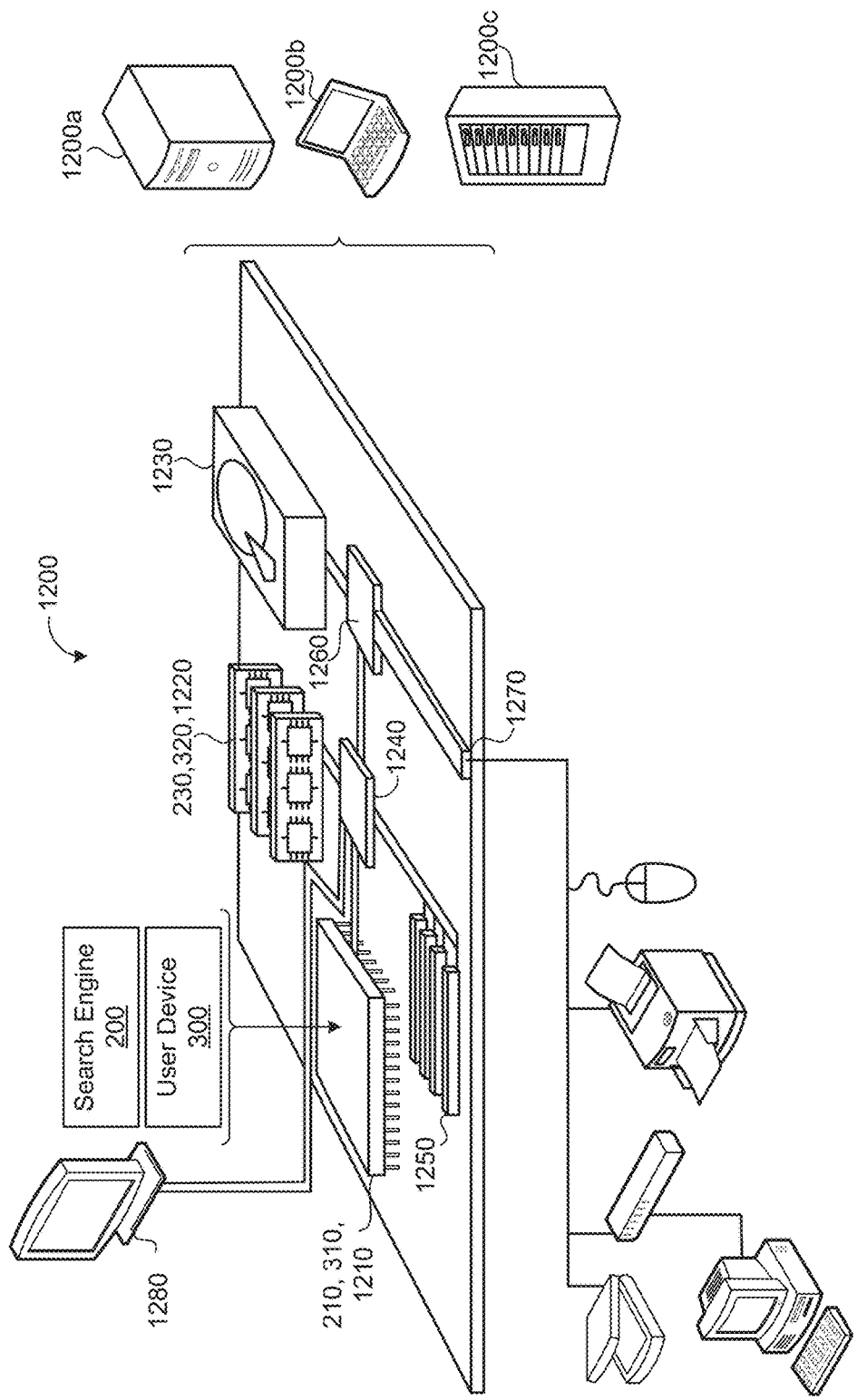
FIG. 12 is a schematic view of an example computing device executing any systems or methods described herein.

FIG. 12 is a schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to the low speed bus 1270 and storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 230, 320, 1220 or on the storage device 230, 320, 1220 to display graphical information for a graphical user interface (GUI) on an external input/output device, such as a display 1280 coupled to a high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 230, 320, 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 230, 320, 1220 is capable of providing mass storage for the computing device 1200. In some implementations, the storage device 230, 320, 1220 is a computer-readable medium. In various different implementations, the storage device 230, 320, 1220 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 230, 320, 1220, the storage device 230, 320, 1220, or memory on processor 210, 310, 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and low-speed expansion port 1270. The low-speed expansion port 1270, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1200 may be implemented in a number of different forms, as shown in FIG. 12. For example, it may be implemented as a standard server 1200 or multiple times in a group of such servers 1200*a*, as a laptop computer 1200*b*, or as part of a rack server system 1200*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device," and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server 170, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for improving performance of a user search interface on a user device, the method comprising:
    transmitting, by a processing device of the user device, a search query to a search engine via a network;
    receiving, by the processing device, search results from the search engine via the network, the search results including at least one application result object defining an application card and a query result object defining a query card, each application card being a graphical user interface element that links to a state of one of a plurality of applications and the query card being a graphical user interface element that corresponds to a selected search query and includes a plurality of input elements, and each input element of the plurality of input elements being configured to receive an input from a user via the user search interface of the user device;
    displaying, by the processing device, the search results via the user search interface;
    receiving, by the processing device, a value corresponding to each input element receiving the input from the user among the plurality of input elements;
    receiving, by the processing device, a user selection of the query card;
    updating, by the processing device, the selected search query based on the query card selected by the user and the received value, wherein the selected search query is updated by using a query identifier corresponding to the query card, and a set of query terms known to the search engine is identified by the query identifier, whereby the updating of the selected search query using the known set of query terms improves the performance of the user search interface; and
    transmitting, by the processing device, the selected search query to the search engine.

2. The method of claim 1, wherein the updating of the selected search query comprises:
    generating the selected search query as a structured search query having one or more parameter fields that respectively receive predetermined parameter types;
    determining the value corresponding to each input element of the plurality of input elements of the query card; and
    assigning the value corresponding to each input element of the plurality of input elements to a corresponding parameter field of the structured search query.

3. The method of claim 1, wherein the updating of the selected search query comprises:
    generating the selected search query using a template that identifies a set of predetermined query terms corresponding to the query card and one or more parameter fields that receive predetermined parameter types, the selected search query being a natural language search query;
    determining the value corresponding to each input element of the plurality of input elements of the query card; and
    assigning the value corresponding to each input element of the plurality of input elements to a corresponding parameter field of the selected search query.

4. The method of claim 1, further comprising:
    receiving, by the processing device, new search results in response to the selected search query, the new search results including one or more new application cards, each of the new application cards including a set of access mechanisms that is based on the set of the plurality of input elements; and
    displaying, by the processing device, the new search results.

5. The method of claim 4, wherein the one or more new application cards, when displayed, display the value corresponding to each input element of the plurality of input elements in each of the one or more new application cards.

6. The method of claim 4, further comprising:
receiving, by the processing device, a user selection of one of the new application cards;
launching, by the processing device, a native application indicated by an access mechanism of the set of access mechanisms; and
setting, by the processing device, the native application to a state indicated by the access mechanism.

7. The method of claim 6, wherein the access mechanism is a script.

8. The method of claim 6, wherein the access mechanism is an application resource identifier.

9. The method of claim 6, wherein the launching of the native application comprises: downloading, by the processing device, the native application from a digital distribution platform.

10. The method of claim 4, wherein for each new application card, the set of access mechanisms is generated based on the value corresponding to each input element of the plurality of input elements.

11. A user device configured to improve performance of a user search interface comprising:
a network interface;
the user search interface;
a processing device in communication with the network interface and the user search interface; and
a non-transitory storage device in communication with the processing device, the non-transitory storage device storing instructions that when executed on the processing device cause the processing device to perform operations comprising:
transmitting a search query to a search engine via a network;
receiving search results from the search engine via the network, the search results including at least one application result object defining an application card and a query result object defining a query card, each application card being a graphical user search interface element that links to a state of one of a plurality of applications and the query card being a graphical user interface element that corresponds to a selected search query and includes a plurality of input elements, and each input element of the plurality of input elements being configured to receive an input from a user via the user search interface;
displaying the search results on the user search interface;
receiving a value corresponding to each input element receiving the input from the user among the plurality of input elements;
receiving a user selection of the query card;
updating, by the processing device, the selected search query based on the query card selected by the user and the received value, wherein the selected search query is updated by using a query identifier corresponding to the query card, and a set of query terms known to the search engine is identified by the query identifier, whereby the updating of the selected search query using the known set of query terms improves the performance of the user search interface; and
transmitting the selected search query to the search engine.

12. The user device of claim 11, wherein the updating of the selected search query comprises:
generating the selected search query as a structured search query having one or more parameter fields that respectively receive predetermined parameter types;
determining the value corresponding to each input element of the plurality of input elements of the query card; and
assigning the value corresponding to each input element of the plurality of input elements to a corresponding parameter field of the structured search query.

13. The user device of claim 11, wherein the updating of the selected search query comprises:
generating the selected search query using a template that identifies a set of predetermined query terms corresponding to the query card and one or more parameter fields that receive predetermined parameter types, the selected search query being a natural language search query;
determining the value corresponding to each input element of the plurality of input elements of the query card; and
assigning the value corresponding to each input element of the plurality of input elements to a corresponding parameter field of the selected search query.

14. The user device of claim 11, wherein the operations further comprise:
receiving new search results in response to the selected search query, the new search results including one or more new application cards, each of the new application cards including a set of access mechanisms that is based on the plurality of input elements; and
displaying the new search results.

15. The user device of claim 14, wherein the one or more new application cards display the value corresponding to each input element of the plurality of input elements in each of the one or more new application cards.

16. The user device of claim 14, wherein the operations further comprise:
receiving a user selection of one of the new application cards;
launching a native application indicated by an access mechanism of the set of access mechanisms; and
setting the native application to a state indicated by the access mechanism.

17. The user device of claim 16, wherein the access mechanism includes a script.

18. The user device of claim 16, wherein the access mechanism includes an application resource identifier.

19. The user device of claim 16, wherein launching the native application comprises downloading the native application from a digital distribution platform.

20. The user device of claim 14, wherein for each new application card of the one or more new application cards, the set of access mechanisms is generated based on the value corresponding to each input element of the plurality of input elements.

* * * * *